United States Patent
Li et al.

(10) Patent No.: US 9,153,832 B2
(45) Date of Patent: Oct. 6, 2015

(54) ELECTROCHEMICAL CELL STACK HAVING A PROTECTIVE FLOW CHANNEL

(71) Applicant: UniEnergy Technologies, LLC., Mukilteo, WA (US)

(72) Inventors: Liyu Li, Richland, WA (US); Jinfeng Wu, Mukilteo, WA (US); Chenxi Sun, Seattle, WA (US)

(73) Assignee: UniEnergy Technologies, LLC, Mukilteo, WA (US)

( * ) Notice: Subject to any disclaimer, the term of this patent is extended or adjusted under 35 U.S.C. 154(b) by 25 days.

(21) Appl. No.: 14/213,927

(22) Filed: Mar. 14, 2014

(65) Prior Publication Data
US 2014/0272484 A1 Sep. 18, 2014

Related U.S. Application Data

(60) Provisional application No. 61/792,965, filed on Mar. 15, 2013.

(51) Int. Cl.
*H01M 8/18* (2006.01)
*H01M 8/20* (2006.01)

(52) U.S. Cl.
CPC ................ *H01M 8/188* (2013.01); *H01M 8/20* (2013.01); *Y02E 60/528* (2013.01)

(58) Field of Classification Search
CPC ....... H01M 8/188; H01M 8/20; Y02E 60/528
See application file for complete search history.

*Primary Examiner* — Carlos Barcena
(74) *Attorney, Agent, or Firm* — Christensen O'Connor Johnson Kindness PLLC

(57) ABSTRACT

Disclosed herein are improved electrochemical cell stacks having at least one protective channel on an end of the stack. Redox flow batteries (RFBs) containing the "protected" electrochemical cell stacks, and methods of operating such RFBs, are also provided.

24 Claims, 16 Drawing Sheets

ELECTROCHEMICAL CELL STACK HAVING A PROTECTIVE FLOW CHANNEL

CROSS-REFERENCE TO RELATED APPLICATION

This application claims the benefit of U.S. Provisional Application No. 61/792,965, filed Mar. 15, 2013, the disclosure of which is hereby incorporated by reference herein in its entirety.

BACKGROUND

Concerns over the environmental consequences of burning fossil fuels have led to an increasing use of renewable energy generated from sources such as solar and wind. The intermittent and varied nature of such renewable energy sources, however, has made it difficult to fully integrate these energy sources into electrical power grids and distribution networks. A solution to this problem has been to employ large-scale electrical energy storage (EES) systems, which systems are widely considered to be an effective approach to improve the reliability, power quality, and economy of renewable energy derived from solar or wind sources.

Among the most promising large-scale EES technologies are redox flow batteries (RFBs). RFBs are special electrochemical systems that can repeatedly store and convert megawatt-hours (MWhs) of electrical energy to chemical energy and chemical energy back to electrical energy when needed.

In simplified terms, an electrochemical cell is a device capable of either deriving electrical energy from chemical reactions, or facilitating chemical reactions through the introduction of electrical energy. An electrochemical cell comprises two half-cells. Each half-cell comprises an electrode and an electrolyte. The two half-cells may use the same electrolyte, or they may use different electrolytes. In a full electrochemical cell, species from one half-cell lose electrons (oxidation) to their electrode while species from the other half-cell gain electrons (reduction) from their electrode. Plural electrochemical cells electrically connected together in series within a common housing are generally referred to as an electrochemical "stack."

A redox (reduction/oxidation) flow battery (RFB) is a special type of electrochemical system in which electrolyte containing one or more dissolved electroactive species flows through electrochemical cells. A common RFB electrochemical cell configuration comprises two opposing electrodes separated by an ion exchange membrane or other separator, and two circulating electrolyte solutions, referred to as the "anolyte" and "catholyte." The energy conversion between electrical energy and chemical potential occurs instantly at the electrodes once the liquid electrolyte begins to flow through the cells. The advantages of RFBs include short response time, low self-discharge, long life-time, and independent tunable power and storage capacity, which make it possible to independently scale up the electricity storage capacity and power generation capacity.

The construction and operation of RFBs may be better understood with reference to FIGS. 1A and 1B. The illustrated RFB includes an electrochemical cell 100, a catholyte tank 15, filled with liquid catholyte 20, and an anolyte tank 30, filled with liquid anolyte 35. The RFB 10 operates by circulating the catholyte 20 and anolyte 35 into the electrochemical cell 100, which then operates in order to discharge or store as directed by power and control element 50 which is in electrical communication with the electrochemical cell 100.

While a single electrochemical cell 100 is illustrated in FIG. 1A, it will be appreciated that multiple electrochemical cells, assembled into a stack, can also be used in an RFB. An example of such a stack is illustrated in FIGS. 2A and 2B.

In one mode (sometimes referred to as the "charging" mode), the power and control element 50, connected to a power source, operates to store electrical energy as chemical potential in the catholyte 20 and anolyte 35. The power source can be any power source known to generate electrical power, include renewable power sources, such as wind, solar, and hydroelectric. Traditional power sources, such as combustion, can also be used.

In a second ("discharge") mode of operation, the RFB 10 is operated to transform the chemical potential stored in the catholyte 20 and anolyte 35 into electrical energy that is then discharged on demand by power and control element 50, which supplies an electrical load. FIG. 1A illustrates the flow of electrons ("e−") through the RFB 10 in discharge mode. The operation of the RFB 10 in charging mode is essentially the opposite of operation in discharge mode.

The operation of RFBs, such as that illustrated in FIG. 1A, are well known to those of skill in the art.

Referring now specifically to FIG. 1B, a close up view of the electrochemical cell 100 as illustrated in FIG. 1A is depicted. The electrochemical cell 100 includes a positive electrode 105, a negative electrode 115, a catholyte channel 110, an anolyte channel 120, and an ion transfer membrane 125 separating the catholyte channel 110 and the anolyte channel 120. The ion transfer membrane 125 separates the electrochemical cell 100 into a positive side 130 and a negative side 135. Selected ions (e.g., H+) are allowed to transport across the ion transfer membrane 125 as part of the electrochemical charge and discharge process. Electrons flow outside the electrochemical cell 100 and through the power and control element 50.

Also illustrated in FIG. 1B are inlets and outlets configured to allow integration of the electrochemical cell 100 into the RFB 10 electrolyte flow systems: a catholyte inlet 107 and a catholyte outlet 109, as well as an anolyte inlet 117 and an analyte outlet 119.

Referring back to FIG. 1A, the electrochemical cell 100 is integrated into the RFB such that during operation, the catholyte 20 flows through the catholyte delivery channel 55, aided by a first pump 25, into the catholyte channel 110 of the electrochemical cell 100. Similarly, the anolyte 35 flows through an anolyte delivery channel 65, with the aid of a second pump 40, and into the anolyte channel 120 of the electrochemical cell.

After operation of the electrochemical cell 100 to either discharge or store electrical energy, the catholyte flows from the catholyte channel 110 through a catholyte return channel 60 back to the catholyte tank 15. Similarly, the anolyte 35 flows from the anolyte channel 120 in the electrochemical cell 100 through the anolyte return channel 70 to the anolyte tank 30.

The operation of the RFB 10 continues as needed to discharge or store electrical energy.

To obtain high voltage/power systems, a plurality of single electrochemical cells may be assembled together in series to form a stack of electrochemical cells (referred to herein as a "stack," a "cell stack," or an "electrochemical cell stack"). Several cell stacks may then be further assembled together to form a battery system. A MW-level RFB system can be created and generally has a plurality of cell stacks, with each cell stack having more than twenty electrochemical cells.

The combination of a plurality of electrochemical cells is illustrated in FIG. 2A, which shows a schematic illustration of the structure of a four-cell stack assembly that could be used in an RFB.

Referring to FIG. 2A, an electrochemical cell stack 200 as can be integrated into an RFB, for example to replace electrochemical cell 100 illustrated in FIG. 1A, is depicted schematically. The cell stack 200 includes a plurality of electrochemical cells, similar to the electrochemical cell 100 illustrated in FIGS. 1A and 1B; however, the electrochemical cells are arranged fluidically in parallel and electrically in series in order to allow current to pass across the entire stack from a positive electrode 230 to a negative electrode 235.

The cell stack 200 includes end plates 240 and 245 in order to mechanically press the structure together to provide structural integrity between the layers of the cell stack 200. For example, tie rods spanning the stack 200 can be used to connect the end plates 240 and 245 and apply a force between them sufficient to maintain the structure of the cell stack 200.

Each cell of the cell stack 200 includes a catholyte channel 110 and an anolyte channel 120, separated by an ion transfer membrane 125. In between the individual cells is a bipolar plate electrode that is able to hold a positive charge on one side and a negative charge on the opposite side of the material. Bipolar electrodes 205 are also used in between the positive electrode 230 and the cell stack, as well as in between the negative electrode 235 and the cell stack. The bipolar plate electrodes 205 can be the same or different material across the cell stack 200.

The cell stack 200 operates in an RFB by passing catholyte and anolyte through their respective channels (110 and 120). The catholyte is delivered to the cells by a catholyte delivery manifold 250, which provides liquid communication between the catholyte tank (e.g., catholyte tank 30 in FIG. 1A) and the cell stack 200. As depicted in FIG. 2A, the catholyte delivery manifold 250 is in liquid communication with each of the catholyte channels 110 within the cell stack 200. Similarly, an anolyte delivery manifold 255 delivers anolyte to the anolyte channels 120 of the cell stack 200 from the anolyte tank of the RFB (e.g., anolyte tank 30 in FIG. 1A).

On the return side of the cell stack 200 a catholyte return manifold 260 collects catholyte from the catholyte channels 110 and returns them to the catholyte tank (e.g., catholyte tank 30 in FIG. 1A). Similarly, the anolyte return manifold 265 collects anolyte from the anolyte channels 120 and returns the collected anolyte to the anolyte tank (e.g., anolyte tank 30 in FIG. 1A).

The cell stack 200 illustrated in FIG. 2A is referred to herein as a "U-shaped" stack because the anolyte flows to and returns from the cell stack 200 on the same side of the cell stack (the left-hand side of FIG. 2A). An alternative configuration, referred to herein as a "Z-shaped" stack, is illustrated in FIG. 2B, wherein the anolyte and catholyte flow to the cell stack 200 from one side and flow away from the cell stack 200 on the opposite side.

Despite their advantages, one issue associated with RFBs is inhomogeneous electrical performance of individual electrochemical cells within a cell stack. Accordingly, there is a need to improve the reliability of cell stacks to ensure long-term operation of RFBs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a protected electrochemical cell stack for a redox flow battery is provided. In one embodiment, the protected electrochemical cell stack includes:

(a) a plurality of electrochemical cells configured in a stack, wherein each of the plurality of electrochemical cells comprises a positive portion separated from a negative portion by an ion transfer membrane, wherein the positive portion comprises a cathode separated from the ion transfer membrane by an electrochemical cell catholyte channel, and wherein the negative portion comprises an anode separated from the ion transfer membrane by an electrochemical cell anolyte channel; and (b) a first protective cell disposed on a first end of the stack, wherein the first protective cell comprises a first protective cell anolyte channel and a first protective cell catholyte channel, wherein the first protective cell anolyte channel is in liquid communication with at least one electrochemical cell anolyte channel in the plurality of electrochemical cells, wherein the first protective catholyte channel is in liquid communication with at least one electrochemical cell catholyte channel in the plurality of electrochemical cells, and wherein the first protective cell anolyte channel is not in ionic communication with the first protective cell catholyte channel.

In another aspect, a protected electrochemical cell stack for a redox flow battery is provided. In one embodiment the protected electrochemical cell stack comprises:

(a) a plurality of electrochemical cells configured in a stack, wherein each of the plurality of electrochemical cells comprises a positive portion separated from a negative portion by an ion transfer membrane, wherein the positive portion comprises a cathode separated from the ion transfer membrane by an electrochemical cell catholyte channel, and wherein the negative portion comprises an anode separated from the ion transfer membrane by an electrochemical cell anolyte channel; and (b) a first protective channel disposed on a first end of the stack, wherein the first protective channel is in liquid communication with either at least one electrochemical cell anolyte channel in the plurality of electrochemical cells or at least one electrochemical cell catholyte channel in the plurality of electrochemical cells, and wherein the first protective channel is configured to allow an electrolyte to pass without undergoing an electrochemical reaction.

In another aspect, a method of operating a redox flow battery is provided. In one embodiment, the method comprises:

(a) providing an electrochemical stack according to the embodiments disclosed herein; and (b) flowing anolyte and catholyte through the plurality of electrochemical cells and the first protective cell.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1A:
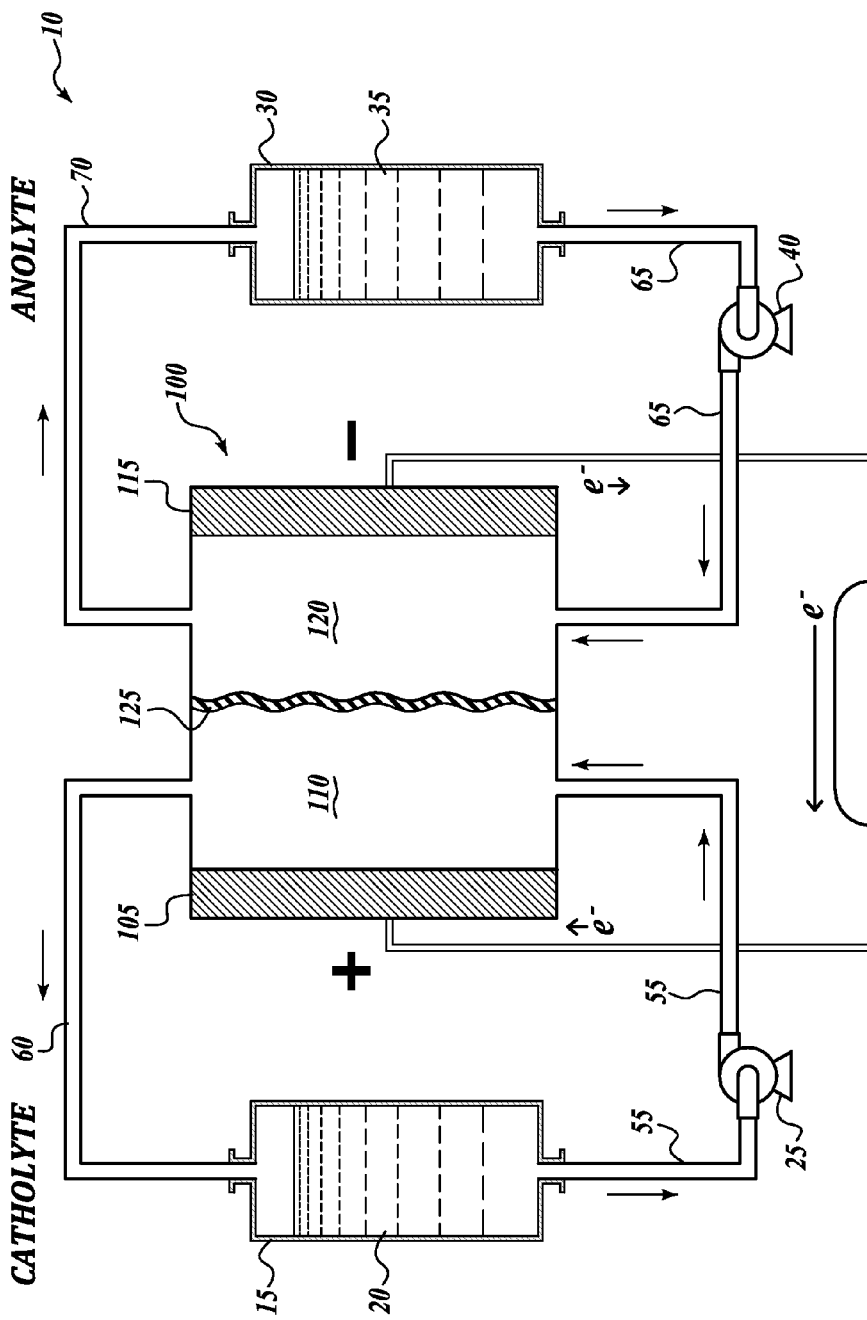
FIG. 1A is a schematic illustration of the structure of an exemplary redox flow battery as known in the prior art.
Figure 1B:
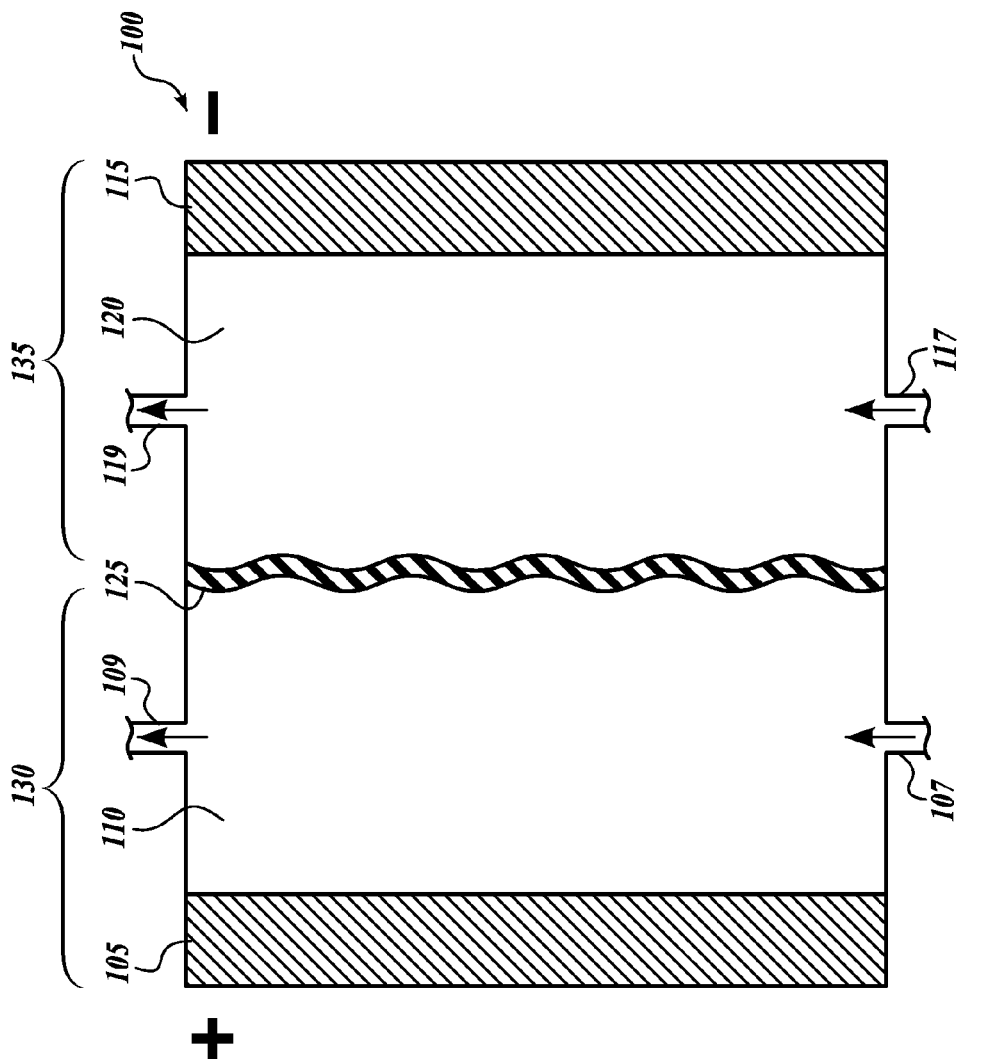
FIG. 1B is a close up view of the electrochemical cell within the redox flow battery of FIG. 1A.

Disclosed herein are improved electrochemical cell stacks having at least one protective channel on an end of the stack, referred to herein as protected electrochemical cell stacks. Redox flow batteries (RFBs) containing the "protected" cell stacks, and methods of operating such RFBs, are also provided. The disclosed protected electrochemical cell stacks can be integrated into RFBs, for example, in the same manner as the electrochemical cell 100 (FIGS. 1A and 1B) and cell stack 200 (FIGS. 2A and 2B) previously discussed.

According to scientific observations disclosed herein it has been determined that electrochemical cells positioned at or near the ends of an electrochemical stack fail more frequently than inner cells. Experimental evidence of this phenomenon is described in the Example below and illustrated in FIGS. 3A and 3B, where the end cells in the tested RFB electrochemical stacks showed markedly different electrical characteristics (e.g., higher voltage) than the intermediate cells of the stack. Because the electrochemical cells are assembled in electrical series and thus share the same current, a high end-cell voltage indicates that the work load for the end-cells is larger than the other cells. Long-term operation under a high work load and high voltage may be reasons for end-cell and stack failure.

Without wishing to be bound by theory, it is believed that non-uniform electrolyte flow or temperatures distributions exist at or near the ends of the electrochemical stack, thereby resulting in a higher work load for the end-cells. It is believed that unequal pressure distribution across end plates affects electrolyte flow.

In an effort to remedy the inhomogeneity introduced into a cell stack by the end cells, the cell stack of the present disclosure includes one or more "protective" channels flowing electrolyte but without that electrolyte being subjected to an electrochemical reaction.

The presence of the protective channels improves homogeneity of the electrical characteristics of a stack. Although there are no electrochemical reactions in these protective channels (so they do not contribute to the charge or discharge capacity of the system) the protective channels result in a more uniform voltage distribution among all working electrochemical cells by maintaining uniform temperature and flow distribution amongst working electrochemical cells during operation. As a result, the lifetime of the cell stack and the RFB are extended and performance is improved.

In the embodiments disclosed herein, the electrochemical energy stacks are sometimes described in the context of an all-vanadium redox flow battery (VRFB), wherein a $V^{3+}/V^{2+}$ sulfate solution serves as the negative electrolyte ("anolyte") and a $V^{5+}/V^{4+}$ sulfate solution serves as the positive electrolyte ("catholyte"). It is to be understood, however, that other redox chemistries are contemplated and within the scope of the present disclosure, including, but not limited to, $V^{2+}/V^{3+}$ vs. $Br^-/ClBr_2$, $Br_2/Br^-$ vs. $S/S^{2-}$, $Br^-/Br_2$ vs. $Zn^{2+}/Zn$, $Ce^{4+}/Ce^{3+}$ vs. $V^{2+}/V^{3+}$, $Fe^{3+}/Fe^{2+}$ vs. $Br_2/Br^-$, $Mn^{2+}/Mn^{3+}$ vs. $Br_2/Br^-$, $Fe^{3+}/Fe^{2+}$ vs. $Ti^{2+}/Ti^{4+}$, and any other redox chemistries known to those of skill in the art.

Furthermore, the protected cell stacks of the present disclosure are not limited to those used in RFBs. The protected cell stacks can be used in any system that requires a plurality of electrochemical cells and benefits from a protective channel or protective cell. Examples include systems for electrolysis of brine to produce NaOH and chlorine; and systems for sea water desalination via electrodialysis.

Protective Cells in an Electrochemical Stack

In certain aspects, the protective channels form a protective cell, similar to an electrochemical cell in that anolyte and catholyte flow through the protective cell, but instead of an ion transport membrane, the protective cell has no ionic communication between anolyte and catholyte channels. As a non-limiting example, the protective cell may be similar to an electrochemical cell but with a non-ion-permeable barrier to prevent ionic communication.

In one such aspect, a protected electrochemical cell stack for a redox flow battery is provided. In one embodiment, the protected electrochemical cell stack includes:

(a) a plurality of electrochemical cells configured in a stack, wherein each of the plurality of electrochemical cells comprises a positive portion separated from a negative portion by an ion transfer membrane, wherein the positive portion comprises a cathode separated from the ion transfer membrane by an electrochemical cell catholyte channel, and wherein the negative portion comprises an anode separated from the ion transfer membrane by an electrochemical cell anolyte channel; and (b) a first protective cell disposed on a first end of the stack, wherein the first protective cell comprises a first protective cell anolyte channel and a first protective cell catholyte channel, wherein the first protective cell anolyte channel is in liquid communication with at least one electrochemical cell anolyte channel in the plurality of electrochemical cells, wherein the first protective catholyte channel is in liquid communication with at least one electrochemical cell catholyte channel in the plurality of electrochemical cells, and wherein the first protective cell anolyte channel is not in ionic communication with the first protective cell catholyte channel.

Figure 4A:
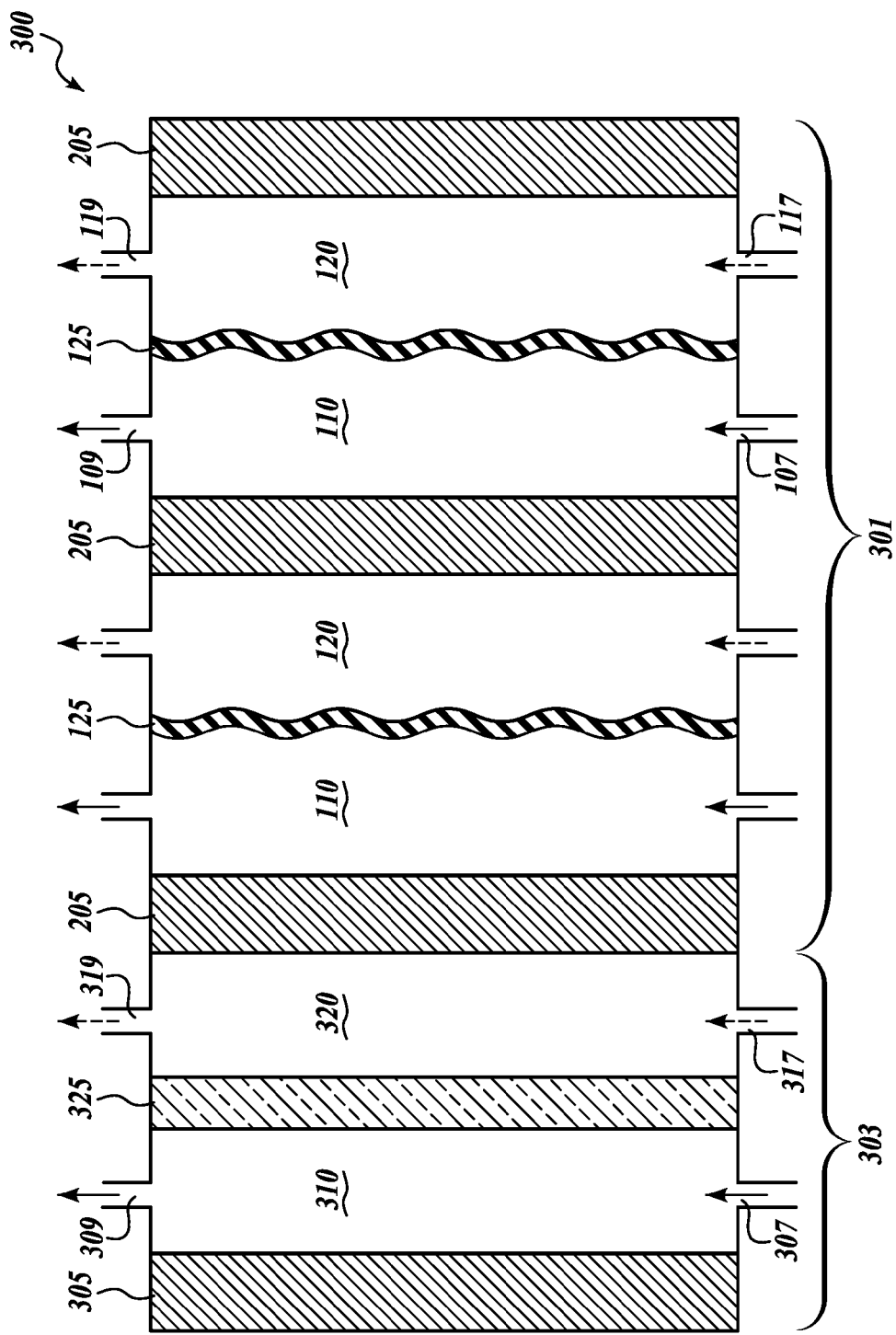
FIG. 4A is a schematic illustration of an exemplary protected electrochemical cell stack having an end protective cell, in accordance with the embodiments of the present disclosure.

The protected electrochemical cell stack may be better understood with reference to FIG. 4A, which is a schematic illustration of a protected electrochemical cell stack 300 ("protected stack") in accordance with the embodiments of the disclosure. The protected stack 300 includes a plurality of electrochemical cells configured in a stack 301. The stack 301 is similar to the stacks 200 illustrated in FIGS. 2A and 2B.

The electrochemical cell stack 301 illustrated in FIG. 4A only depicts two electrochemical cells, defined by a catholyte channel 110 and an anolyte channel 120 separated by an ion transport membrane 125. However, it will be appreciated that the depiction of FIG. 4A is not limiting of the embodiments of the disclosure and any number of electrochemical cells within the electrochemical cell stack 301 are contemplated. In one embodiment, the protected stack 300 has 10 or more electrochemical cells. In one embodiment, the protected stack 300 has 20 or more electrochemical cells.

The protected stack 300 includes a first protective cell 303 on a first end of the stack 301. The protective cell 303 includes a first protective cell catholyte channel 310 and a first protective cell anolyte channel 320, which are configured to pass electrolyte in a similar manner as in traditional electrochemical cells (e.g., channels 110 and 120). Catholyte is supplied to the catholyte channel 310 by a catholyte inlet 307 and catholyte passes from the catholyte channel 310 via a catholyte outlet 309, which returns the catholyte to the catholyte tank of the RFB. Similarly, anolyte is supplied to the protective anolyte channel 320 by an anolyte inlet 317 and anolyte passes from the protective anolyte channel 320 via an anolyte outlet 314 before eventually passing on to the anolyte tank. The protective catholyte channel 310 and protective anolyte channel 320 are sized and configured in any manner known to those of skill in the art. In certain embodiments, the channels 310 and 320 are similar in size, shape, and construction as the channels 110 and 120 of the electrochemical cell stack 301 to which the protective cell 303 is attached, with the exception of the impermeable barrier 325, as described below.

The protective catholyte channel 310 is in liquid communication with at least one electrochemical cell catholyte channel 110. This communication is typically effected through a manifold, such as those that have been described previously with regard to traditional electrochemical cell stacks and RFBs, in FIGS. 2A and 2B (manifolds 250, 255, 260, and 265). Similarly, the protective cell anolyte channel 320 is in liquid communication with at least one electrochemical cell anolyte channel 120. This liquid communication helps to homogenize electrolyte flow in the electrochemical cell stack 301.

The protective catholyte channel 310 and protective anolyte channel 320 are separated by an impermeable barrier 325 that is configured to prevent ionic communication between the catholyte channel 310 and anolyte channel 320. The presence of the impermeable barrier 325 instead of an ion transfer membrane 125 (as is present in the electrochemical cell stack 301) renders the protective cell 303 inoperable as an electrochemical cell. However, the structure and integration of the protective cell 303 into the electrochemical protected stack 300 and the larger RFB are otherwise similar.

The impermeable barrier 325 can be any material known to those of skill in the art as compatible with use in electrochemical cell such that no ionic communication is allowed across the impermeable barrier 325. No transfer of ions across the impermeable barrier 325 between electrolytes occurs. The impermeable barrier 325 in certain embodiments also is impermeable to liquid communication across the impermeable barrier 325. Representative barrier materials include graphite and plastics such as polyvinylidene fluoride, polyethylene, and polypropylene that are compounded with electrically conductive addititves (e.g., carbon/graphite) prior to molding or extruding.

By preventing ionic communication between the protective catholyte channel 310 and protective anolyte channel 320, the protective cell 303 essentially is integrated into the anolyte and catholyte flow systems of the RFB without producing the electrical effects of an electrochemical cell. As a result, the inhomogeneity introduced by the end electrochemical cells of a traditional electrochemical cell stack in an RFB are eliminated. By eliminating the end electrochemical cell inhomogeneity, RFBs integrating the protective cell 303 on at least one end of the electrochemical cell stack 301 benefit from more consistent and longer operation without failure.

In one embodiment, the protected cell stack 300 further comprises a plurality of bipolar plate electrodes 205, each comprising a positive side and a negative side, wherein the plurality of bipolar plate electrodes 205 are interposed between the plurality of electrochemical cells such that the positive side of one of the bipolar plate electrodes is in electrical communication with the positive portion of one electrochemical cell and the negative side of the bipolar plate electrode is in electrical communication with the negative portion of an adjacent electrochemical cell. A bipolar plate electrode 205 also separates the electrochemical cell stack 301 and the protective cell 303. Furthermore, a bipolar plate electrode 305 may be used at the end of the protective cell 303 distal to the electrochemical cell stack 301. The bipolar plate electrodes 205 and 305 may be the same or different in composition. Representative bipolar plate electrode materials include graphite and plastics such as polyvinylidene fluoride, polyethylene, and polypropylene that are compounded with electrically conductive additives (e.g., carbon/graphite) prior to molding or extruding.

Figure 4B:
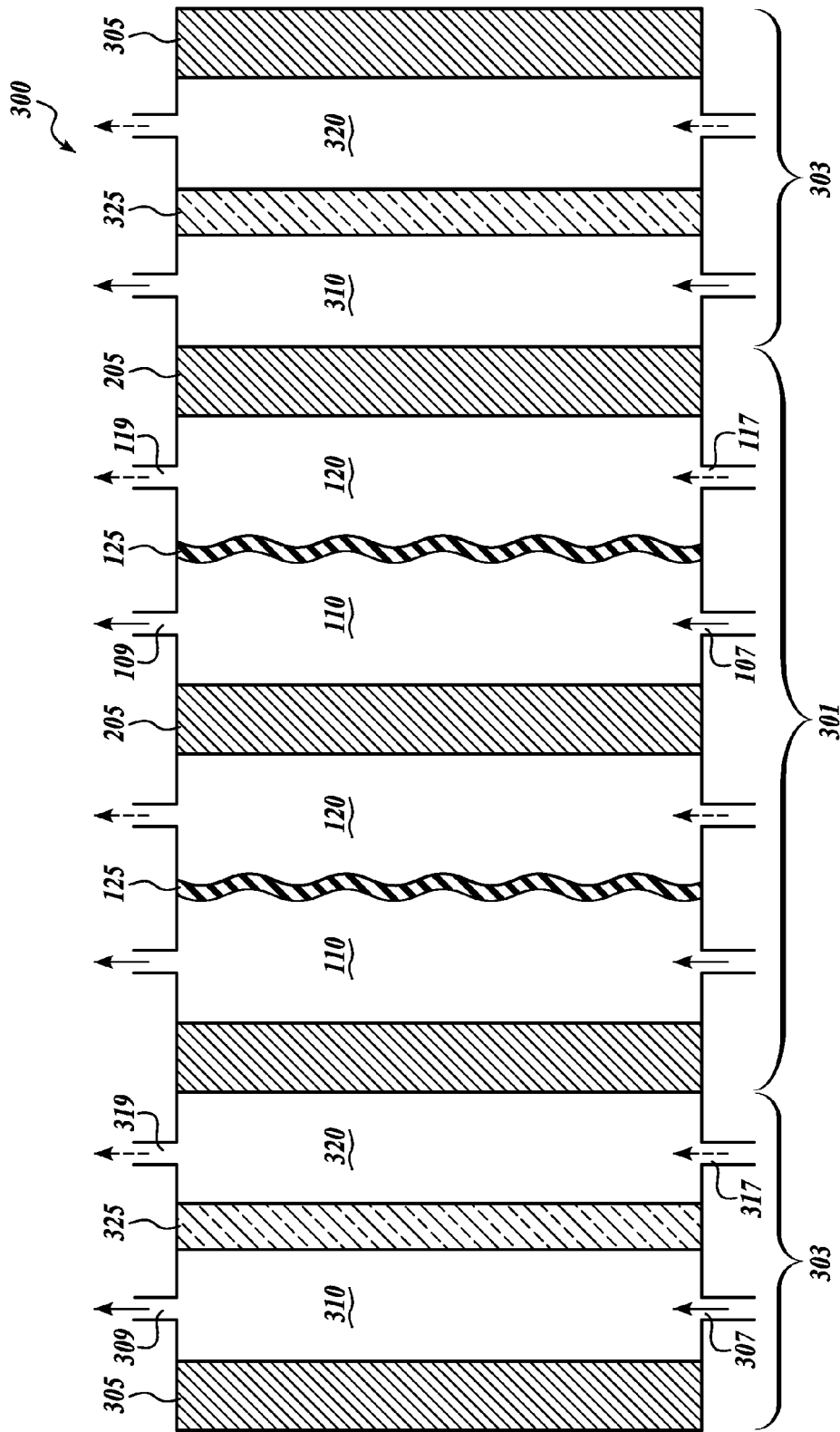
FIG. 4B is a schematic illustration of an exemplary protected electrochemical cell stack having protective cells on both ends, in accordance with the embodiments of the present disclosure.

In one embodiment, the plurality of electrochemical cells are electrically connected in series but spatially arranged fluidically in parallel such that the positive portion of one electrochemical cell faces the negative portion of an adjacent electrochemical cell. In this regard, the catholyte channel 110 of an electrochemical cell is considered a positive portion, and the anolyte channel 120 is considered a negative portion. As illustrated in FIGS. 4A and 4B, the anolyte channels 110 and catholyte channels 120 alternate throughout the electrochemical cell stack 301 and therefore the positive and negative portions of each cell face each other and meet at the bipolar electrode 205, which supports positive charges on the catholyte channel 110 and negative charges on the anolyte channel 120. This configuration is convenient for means of manufacture in that the stacking of cells is possible so as to increase the power density of the electrochemical cell stack by incorporating multiple cells together in a small amount of space.

Further improvement of the electrochemical cell stack 301 may be achieved by adding a second protective cell 303. Accordingly, in illustrated embodiment of FIG. 4B the protected cell stack 300 further comprises a second protective cell 303 disposed on a second end of the stack 301, the second protective cell 303 comprising a second protective cell anolyte channel 320 and a second protective cell catholyte channel 310. In this embodiment, the second protective cell anolyte channel 320 is in liquid communication with at least one electrochemical cell anolyte channel 120 in the plurality of electrochemical cells 301. Furthermore, in this embodiment the second protective catholyte channel 310 is in liquid communication with at least one electrochemical cell catholyte channel 110 in the plurality of electrochemical cells 301. Finally, in this embodiment the second protective cell anolyte channel 320 is not in ionic communication with the second protective cell catholyte channel 310 (e.g., due to the presence of the impermeable barrier 325).

This embodiment may be better understood with reference to FIG. 4B, which is similar to FIG. 4A but with the addition of a second protective cell 303 disposed on the other end of the electrochemical cell stack 301 from the first protective cell 303. The size, configuration, and composition of the two protective cells 303 can be the same or different. For ease of manufacture, in one embodiment, both protective cells 303 are similar in size and composition to each other. In addition, they are similar in size and composition to the electrochemical cells of the electrochemical cell stack 301. The primary difference is the replacement of the ion transport membrane 125 of the electrochemical cells 301 with the impermeable barrier 325 of the protective cells 303.

Figure 2A:
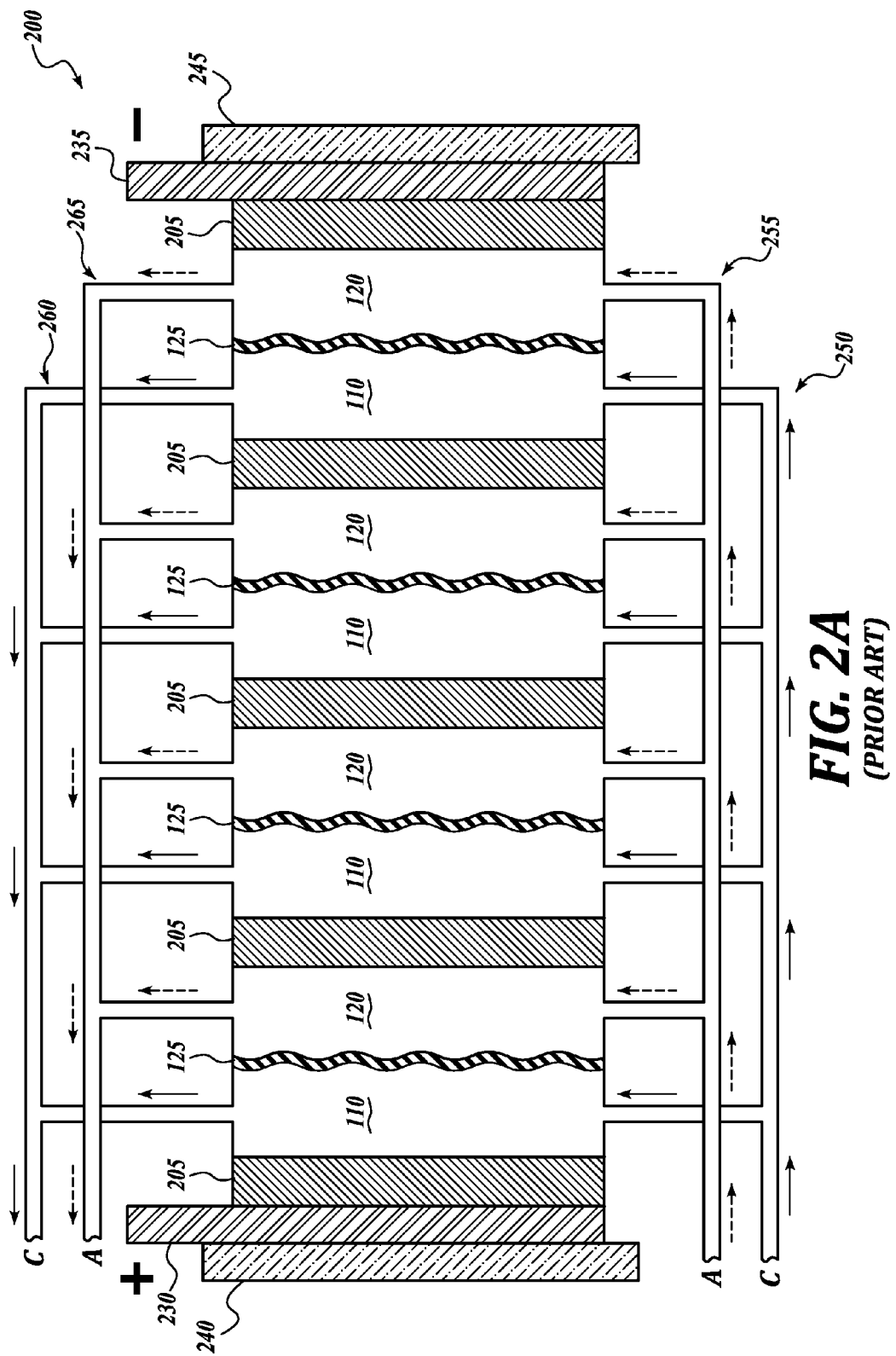
FIGS. 2A and 2B are schematic illustrations of the structure of exemplary four-cell flow battery stack assemblies as known in the prior art, configured in a U-shaped flow pattern stack (FIG. 2A) and a Z-shaped flow pattern stack (FIG. 2B)

Manifolds can be used to transport electrolyte to and from the protected cell stacks (e.g., FIG. 2A manifolds 250, 255, 260, and 265). In one embodiment, the protected cell stack further comprises an anolyte delivery manifold configured to distribute liquid anolyte to the plurality of electrochemical cells and the first protective cell. In one embodiment, the protected cell stack further comprises an anolyte return manifold configured to accept liquid anolyte after passing through the plurality of electrochemical cells and the first protective cell. In one embodiment, the protected cell stack further comprises a catholyte delivery manifold configured to distribute liquid catholyte to the plurality of electrochemical cells and the first protective cell. In one embodiment, the protected cell stack further comprises a catholyte return manifold configured to accept liquid catholyte after passing through the plurality of electrochemical cells and the first protective cell.

Figure 5A:
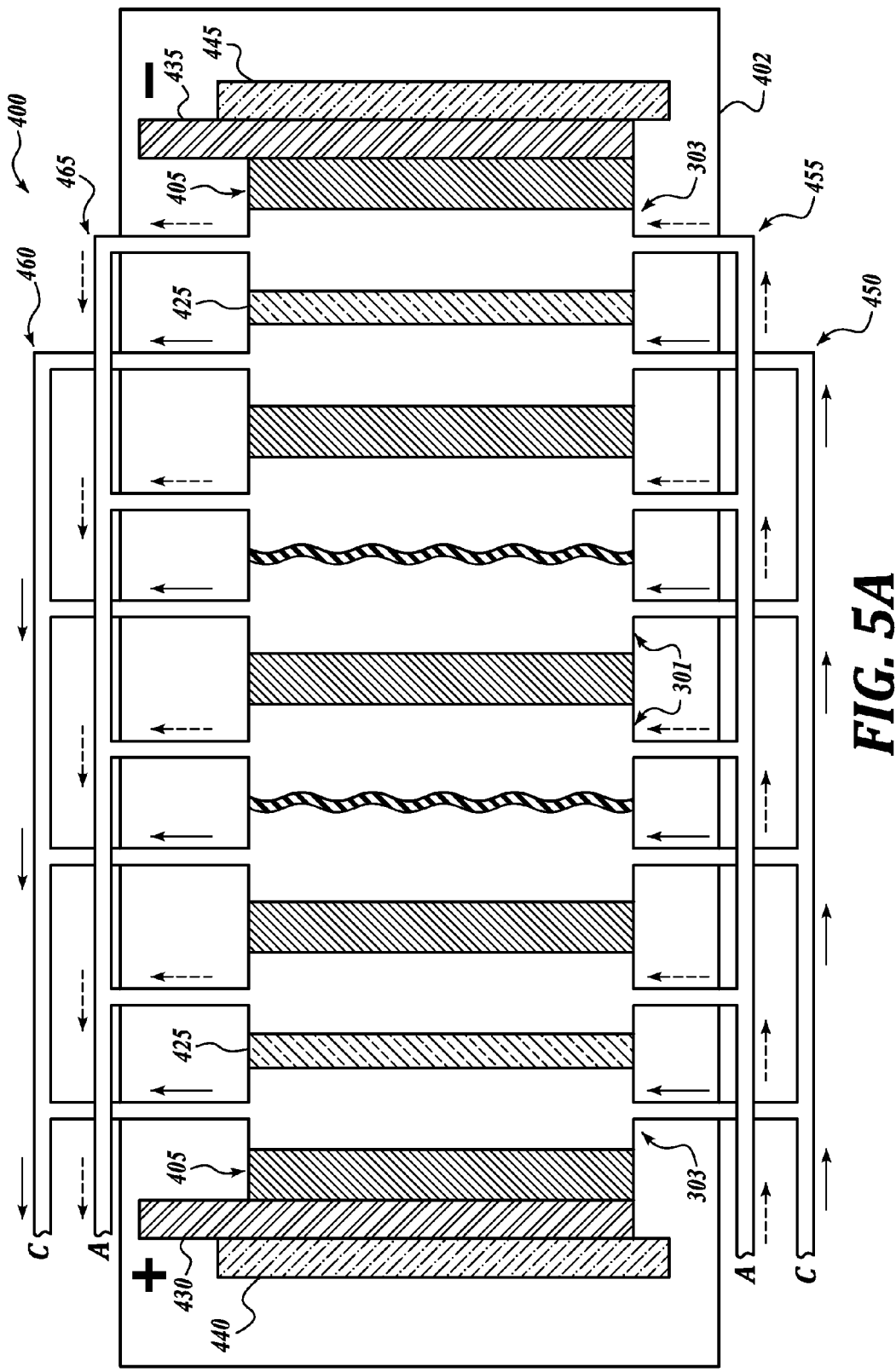
FIG. 5A is a schematic illustration of an exemplary protected electrochemical cell stack having inner protective cells on both ends, in accordance with the embodiments of the present disclosure.

Referring now to FIG. 5A, a view of the protected stack 300 of FIG. 4B, as modified into a protected stack system 400 is illustrated. The protective cells 303 are each mounted on opposite ends of the electrochemical cell stack 301. Catholyte is provided to the protective cells 303 and the electrochemical cell stack 301 via a catholyte delivery manifold 450 configured to distribute catholyte to the electrochemical cells 301 and the protective cells 303. Similarly, an anolyte delivery manifold 455 is configured to distribute anolyte to the electrochemical cells 301 and the protective cells 303. The delivery manifolds 450 and 455 are in liquid communication with the catholyte tank and anolyte tank, respectively, as a source of electrolyte delivered.

On the return side of the protected stack system 400, a catholyte return manifold 460 is configured to accept liquid catholyte after passing through the electrochemical cells 301 and the protective cells 303. Similarly, an anolyte return manifold 465 is configured to accept anolyte after passing through the electrochemical cells 301 and the protective cells 303. The return manifolds 460 and 465 are in liquid communication with the catholyte tank and anolyte tank, respectively, in order to complete the RFB electrolyte loop.

Figure 2B:
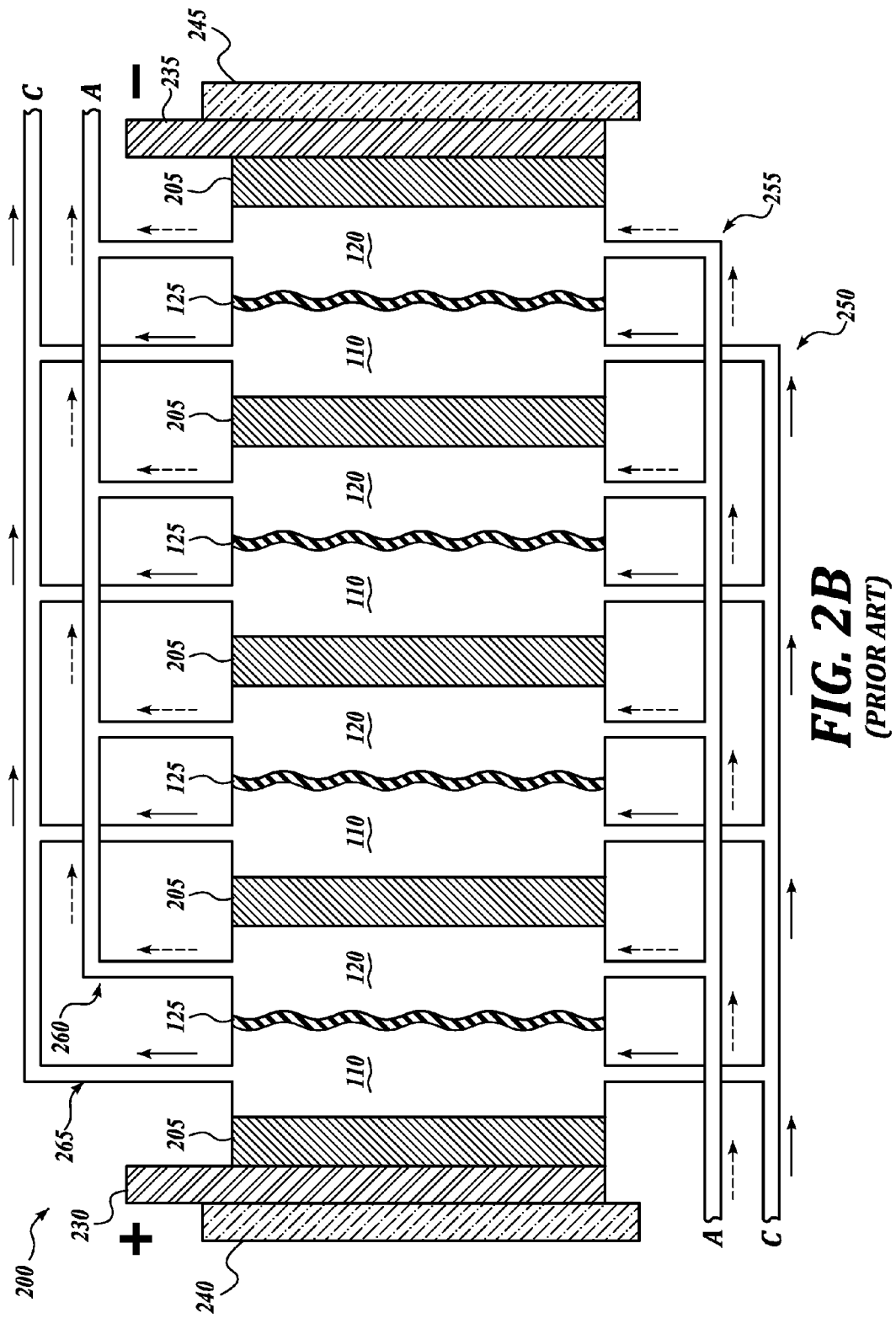

In one embodiment, the protected cell stack further comprises a positive current collector in between a positive end of the stack and the first protective cell. In one embodiment, the protected cell stack further comprises a negative current collector in between a negative end of the stack and the first protective cell. Referring to FIG. 5A, the protected stack system 400 operates to store or discharge electrical energy across the electrochemical cell stack 301 by electrochemical reactions within the electrochemical cells 301. Charges are collected at a positive electrode 430 and a negative electrode 435, similar to the positive and negative electrodes 230 and 235 discussed with regard to FIGS. 2A and 2B. Also similar to FIGS. 2A and 2B is the presence of end plates 440, 445 which mechanically support and constrain the cell stack. Representative electrode 430 and 435 materials include graphite felt, metals (e.g., copper or silver) and plastics such as polyvinylidene fluoride, polyethylene, and polypropylene that are compounded with electrically conductive addititves (e.g., carbon/graphite) prior to molding or extruding. The electrodes 430 and 435 can be formed with multiple layers of materials. For example, in one embodiment the current collector interface at the end of the stack is graphite and a second layer is a metal (e.g., silver or copper) that serves as the interface to the electrical cables that connect the stack to other stacks or parts of the RFB.

The operation of electrochemical cells and RFBs are not the focus of the present application and the details of operation of the cell stack will not be discussed. However, it is noted that the protective cells 303 are configured to allow the continuation of charge transport across the stack 301, through the protective cells 303, and to the electrodes 430 and 435. This is accomplished by utilizing a barrier 425 that is electrically conductive (e.g., by using a bipolar plate electrode material similar to that of bipolar plate 405) as well as the use of a bipolar plate 405 abutting the electrodes 430 and 435. Using these design principles, charges are allowed to travel the length of the electrochemical cell 301 and protective cells 303 in order to complete the required electrical circuit for discharging or storing electrical energy.

In one embodiment, the protected cell stack further comprises a housing enclosing the first protective cell and the stack. Referring to FIG. 5A, a housing 402 enclosing the electrochemical cell stack 301 and the protective cells 303 is illustrated. The housing 402 may allow the passage of anolyte and catholyte via the manifolds (450, 455, 460, and 465) while containing the electrochemical cells 301, protective cells 303, electrodes 430 and 435, and end plates 440 and 445 within the housing 402.

While the housing 402 is only illustrated in FIG. 5A, it will be appreciated that the inclusion of a housing is contemplated for any protected electrochemical cell stack disclosed herein.

The protected stack system 400 illustrated in FIG. 5A is of the type referred to herein as an "inner" protective cell configuration because the protective cells 303 are in between the electrodes 430 and 435. In an alternative embodiment, illustrated in FIG. 5B, an "outer" protective cell configuration of a protected stack system 500 is illustrated. In the protected stack system 500, the parts are essentially the same as illustrated in FIG. 5A with regard to the protected stack system 400, although the arrangement of the electrodes 430 and 435 are different with respect to the protective cells 303. Instead of placing the electrodes 430 and 435 on the far ends of the protected cell stack, as in FIG. 5A, in the outer protected cell system 500 the electrodes 430 and 435 are on opposite ends of the electrochemical cell stack 301 and the protective cells 303 are disposed on the outside of the electrodes 430 and 435. The end plates 440 and 445 are still at the far ends of the system 500 and serve the same purpose as in the previously described systems.

Accordingly, in one embodiment, the protected cell stack further comprises a positive current collector disposed adjacent to the first protective cell and distal to the plurality of electrochemical cells. In one embodiment, the protected cell stack further comprises a negative current collector disposed adjacent to the first protective cell and distal to the plurality of electrochemical cells.

One benefit of the outer protective cell system 500 is that the protective cells 303 are not part of the circuit between electrodes 430 and 435. Therefore, the materials that can be used to form the protective cells 303 are not limited by the requirements of electrical conduction, as in the inner protective cell system 400. Accordingly, in one embodiment the outer protective cells 303 do not conduct electrical current across the cell 303. For example, the barrier 425 does not need to be formed from a conductive material, thereby reducing the design constraints compared to an inner protective cell system 400. In one embodiment the barrier 425 is a non-conducting (i.e., insulating) material.

Figure 5B:
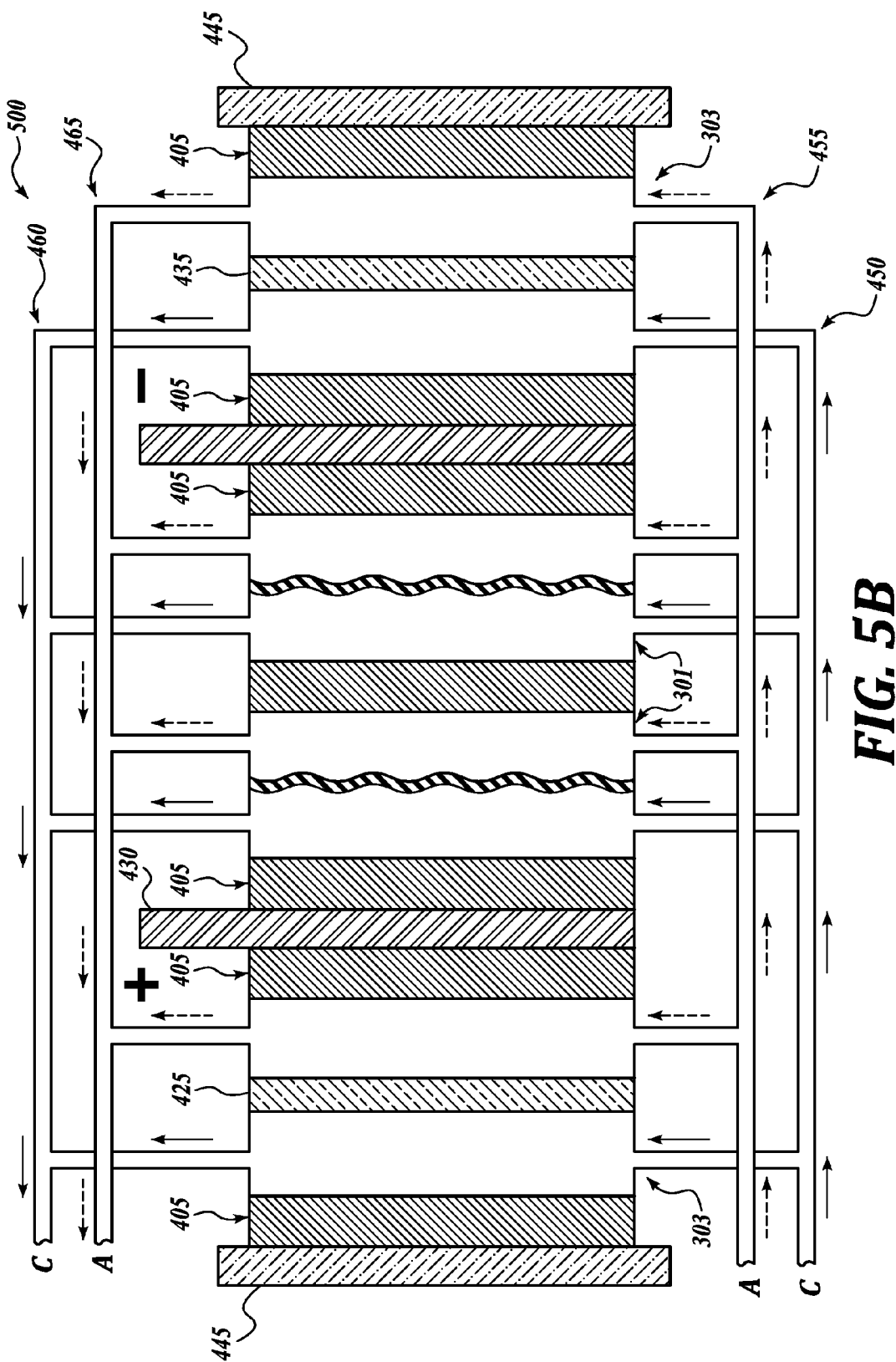
FIG. 5B is a schematic illustration of an exemplary protected electrochemical cell stack having outer protective cells on both ends, in accordance with the embodiments of the present disclosure.

As illustrated in FIG. 5B, the manifolds 450, 455, 460, and 465 still deliver and return anolyte and catholyte to the protective cells 303 and electrochemical cells 301 in the same manner as previously described, such that the benefits of the protective cells 303 are present in the system 500.

It will be appreciated that the description of systems 400 and 500 are illustrated and described as having two protective cells 303, one on each end of the electrochemical cell stack 301; however, the illustrated embodiments are representative of particular embodiments of the disclosed protective cells and alternative embodiments include systems such as those illustrated by having only a single protective cell 303 mounted on one side of the electrochemical cell stack 301. While the full benefit of protective cells 303 is only achieved using protective cells 303 on both ends of the electrochemical cell stack 301, it will be appreciated that the partial benefit can be achieved using only a single protective cell 303.

An experimental comparison between traditional RFB electrochemical cells and protected cells according to the embodiments disclosed herein are discussed in further detail in the Example below and in FIGS. 6, 7A, and 7B.

Protective Cells in an Electrochemical Stack

Previous aspects of the provided embodiments have been described with reference to protective "cells" (e.g., 303), such as those illustrated in FIG. 4A. Protective cells 303 are convenient because in certain embodiments they can be created by modifying previously fabricated electrochemical cell stacks by replacing the ion transport membrane 125 of the end cells of the stack with an impermeable barrier 325. This manual exchange of parts can improve overall performance of the electrochemical cell stack, even though two active electrochemical cells are removed.

Figure 8:
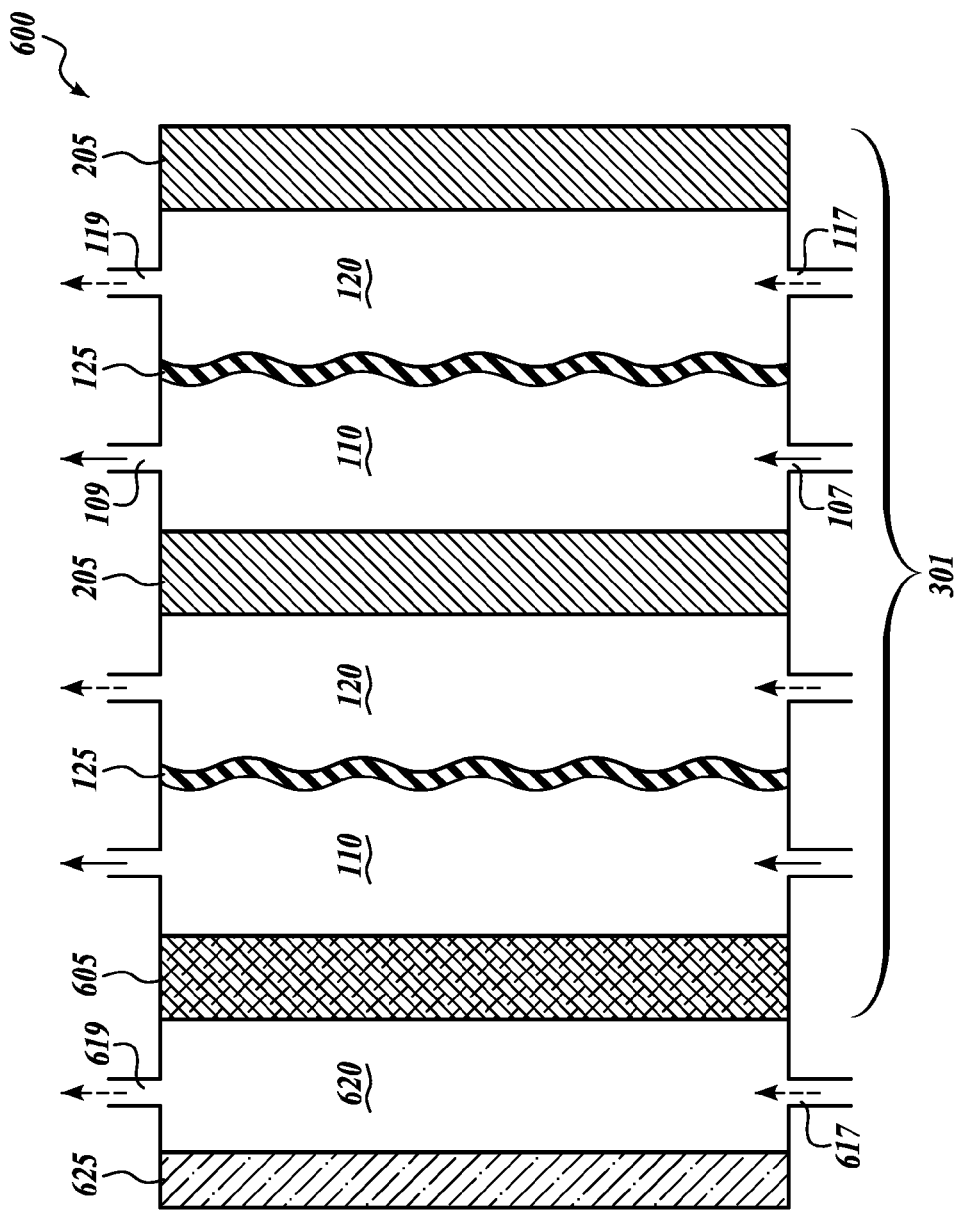
FIG. 8 is a schematic illustration of an exemplary protected electrochemical cell stack having an end protective channel, in accordance with the embodiments of the present disclosure.

Referring now to FIG. 8, in the below-described embodiments, protective cells are not provided, but instead a protective channel 620 is provided on at least one end of an electrochemical cell stack 301 to form a protected stack 600. Similar to the protective cells 303 described previously, the protective channel 620 allows electrolyte (either anolyte or catholyte) to flow through the protective channel 620. The protective channel 620 is adjacent to the electrochemical cell stack 301. This simplified protection scheme only requires one electrolyte to flow through the protective channel 620 instead of two electrolytes flowing through the previously described protective cells 303.

Accordingly, in another aspect, a protected electrochemical cell stack for a redox flow battery is provided. In one embodiment the protected electrochemical cell stack comprises:

(a) a plurality of electrochemical cells configured in a stack, wherein each of the plurality of electrochemical cells comprises a positive portion separated from a negative portion by an ion transfer membrane, wherein the positive portion comprises a cathode separated from the ion transfer membrane by an electrochemical cell catholyte channel, and wherein the negative portion comprises an anode separated from the ion transfer membrane by an electrochemical cell anolyte channel; and (b) a first protective channel disposed on a first end of the stack, wherein the first protective channel is in liquid communication with either at least one electrochemical cell anolyte channel in the plurality of electrochemical cells or at least one electrochemical cell catholyte channel in the plurality of electrochemical cells, and wherein the first protective channel is configured to allow an electrolyte to pass without undergoing an electrochemical reaction.

In one embodiment, the protective channel 620 is integrated into an RFB system such that anolyte flows through the protective channel 620. In another embodiment, the protective channel 620 is integrated into an RFB system such that catholyte flows through the protective channel 620.

Flow through the protective channel 620 is facilitated by an electrolyte inlet 617, which is in liquid communication with at least one anolyte channel 110 or catholyte channel 120 of the electrochemical cell stack 301. This liquid communication is facilitated in certain embodiments by a manifold, such as those illustrated in FIG. 5A (e.g., 450 or 455). On the electrolyte return side, electrolyte passes from the protective channel 620 back to either the anolyte tank or catholyte tank via an electrolyte outlet port 619, which is in liquid communication with at least one anolyte channel 110 or catholyte channel 120 of the electrochemical cell stack 301. This liquid communication, in certain embodiments, is provided by a manifold (e.g., 460 or 465), as illustrated in FIG. 5A.

The protective channel 620 is separated from the adjacent electrochemical cell stack 301 by a wall 605, which in certain embodiments is a bipolar plate (e.g., similar to the bipolar plate 205 illustrated in FIG. 4A). If the protective channel 620 is integrated as an inner protective channel (i.e., a collector electrode is distal to the cell stack 301 from the protective channel 620; not pictured) then wall 605 is a bipolar plate. However, if the protective channel 620 is an outer protective channel (i.e., a collector electrode is in between the cell stack 301 and the protective channel 620; not pictured) then conductivity is not an issue and any material, conductive or insulating, can be used for the wall 605 as long as it is mechanically and chemically compatible with the rest of the system.

On the border of the protective channel 620 furthest from the electrochemical cell stack 301, is a barrier 625. The barrier 625 can be any material known to those of skill in the art as containing and providing structure to the protective cell 620. The barrier 625 may be an ion-blocking material or other material.

As with the wall 605, the barrier 625 can be a bipolar plate or any material depending on the configuration of the protective channel 620 as an inner or outer protective channel.

Figure 9:
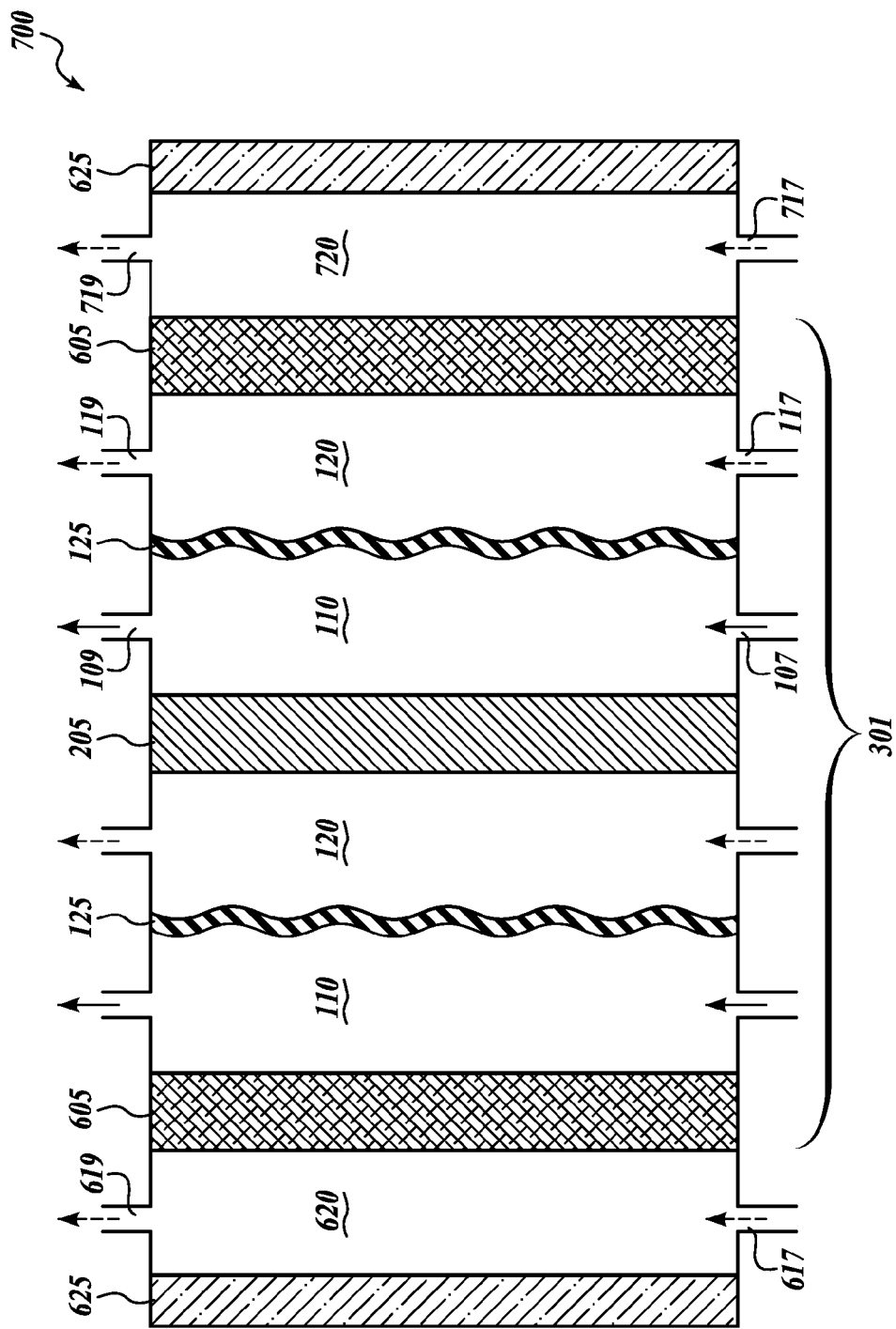
FIG. 9 is a schematic illustration of an exemplary protected electrochemical cell stack having a protective channel on each end, in accordance with the embodiments of the present disclosure.

Referring to FIG. 9, in another embodiment, a second protective channel 720 is disposed adjacent to the electrochemical cell stack 301 on the opposite end as the first protective channel 620 in order to form a protected cell stack 700. The composition and configuration of the second protective channel 720 can be the same or different as the first protective channel 620. The protected cell stack 700 can be incorporated into an RFB system in the same manner as the protected cell stack 600 illustrated in FIG. 8 or other protected cell stacks as previously described.

The electrolyte flowing through the second protective channel 720 can be the same or different as the electrolyte flowing through the first protective channel 620. In one embodiment, anolyte flows through the second protective channel 720. In one embodiment, catholyte flows through the second protective channel 720. In one embodiment, anolyte flows through both the first protective channel 620 and the second protective channel 720. In one embodiment, catholyte flows through the first protective channel 620 and the second protective channel 720. In one embodiment, anolyte flows through one of the first protective channel 620 and the second protective channel 720, and catholyte flows through the other.

The second protective channel 720 is in liquid communication with at least one of the anolyte channels 110 or catholyte channels 120 of the electrochemical cell stack 301. Similar to the first protective channel 620, the second protective channel 720 includes an inlet 717 and an outlet 719 that can connect to delivery and return manifolds (e.g., 450, 455, 460, and 465 of FIG. 5A) for transport of electrolyte to and from the anolyte tank and catholyte tank as part of an RFB system.

While the presence of only the first protective channel 620 in a protected cell stack 600 provides some benefit to the performance of the protected cell stack 600, the presence of the second protective channel 720 on the opposite end of the electrochemical cell stack 301 may provide further benefit in the form of homogenous electrochemical cell performance across the entire protected cell stack 700.

In one embodiment, the protected electrochemical cell stack further comprises a second protective channel adjacent to the first protective channel, wherein the second protective channel is configured to allow an electrolyte to pass without undergoing an electrochemical reaction.

Figure 10:
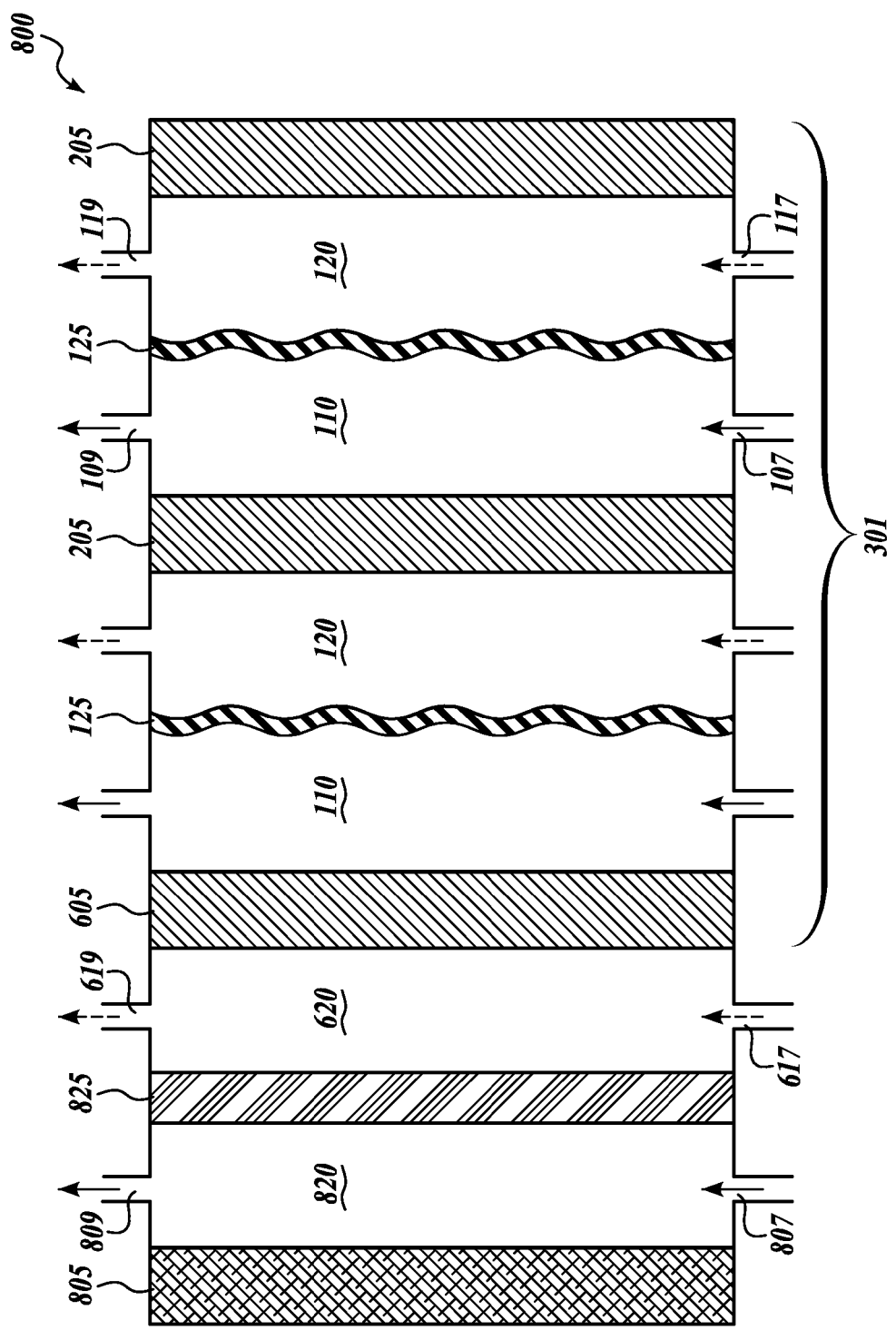
FIG. 10 is a schematic illustration of an exemplary protected electrochemical cell stack having two protective channels on the same end of the stack, in accordance with the embodiments of the disclosure.

Referring to FIG. 10, yet another embodiment including the protective channels is illustrated. In FIG. 10, the protected cell stack 800 includes an electrochemical cell stack 301 as has been discussed previously herein, as well as a first protective channel 620 and a second protective channel 820, mounted distal to the electrochemical cell stack 301. A barrier 825 separates the two channels 620 and 820.

In one embodiment, the barrier 825 allows no ionic communication between the channels 620 and 820. The barrier 825 may be a material of the type described above with regard to barrier 425.

In one embodiment, there is ionic communication between the first protective channel 620 and the second protective channel 820. In this regard, in a further embodiment, the barrier 825 is an ion-transfer membrane (e.g., such as ion-transfer membrane 125) between the first protective channel and the second protective channel. If there is ionic communication across the barrier 825, then the same electrolyte flows in both channels 620 and 820. In yet another embodiment, there may be no barrier 825 or the barrier may be permeable, wherein the same electrolyte flows through both channels 620 and 680.

A wall 805 defines the side of the second protective channel 820 distal to the electrochemical cell stack 301. The wall 805 can be any material configured to mechanically support the structure of the second protective channel 820 and the whole of the protected stack 800. In one embodiment, the wall 805 is a bipolar plate electrode (e.g., bipolar plate electrode 205).

The embodiment illustrated in FIG. 10 is similar in structure to the protected stack 300 illustrated in FIG. 4A, although FIG. 4A is explicitly described as a protective "cell," whereas the protected stack 800 does not necessarily include a protective cell, but instead includes two separate protective channels 620 and 820.

The composition of the second protective channel 820 can be the same or different as the first protective channel 620. Electrolyte flows into the second protective channel 820 via an inlet 807 and flows away via an outlet 809. The second protective channel 820 is in liquid communication with at least one of the catholyte channels 110 and anolyte channels 120 in the electrochemical cell stack 301. The second protective channel 820 can be integrated into an RFB system using anolyte or catholyte delivery and return manifolds (e.g., 450, 455, 460, and 465, as illustrated in FIG. 5A) to provide for flow of electrolyte to and from the second protective channel 820 from either the anolyte tank or catholyte tank of the RFB system.

The electrolyte flowing through the second protective channel 820 can be the same or different as the electrolyte flowing through the first protective channel 620. In one configuration, anolyte flows through the first protective channel 620, and catholyte flows through the second protective channel 820. In one embodiment, catholyte flows through the first protective channel 620, and anolyte flows through the second protective channel 820. In one embodiment, anolyte flows through both the first protective channel 620 and the second protective channel 820. In one embodiment, catholyte flows through both the first protective channel 620 and the second protective channel 820.

Manifolds configured to facilitate the previously described electrolyte configurations within the protective channels 620 and 820 include modified versions of the manifolds 450, 455, 460, and 465 as described with reference to FIG. 5A in order to provide the necessary electrolyte flow to and from the anolyte tank and catholyte tank.

While no electrodes are illustrated in FIGS. 8-10, it will be appreciated that positive and negative electrodes can be integrated into the protected stacks 600, 700, and 800, in the manner described previously. Therefore, both inner and outer protected stacks are contemplated that integrate protective channels, as opposed to protective cells.

Methods of Operating RFBs with Protected Stacks

In another aspect, a method of operating a redox flow battery is provided. In one embodiment, the method comprises:

(a) providing an electrochemical stack according to the embodiments disclosed herein; and (b) flowing anolyte and catholyte through the plurality of electrochemical cells and the first protective cell.

Any of the protected electrochemical cell stacks disclosed herein are contemplated as being integrated into an RFB system known to those of skill in the art. Therefore, methods of operating the disclosed protected stacks are hereby provided.

The following example is included for the purpose of illustrating, not limiting, the described embodiments.

EXAMPLE

Traditional Electrochemical Cell Stacks

A 1.5 kW all-vanadium mixed acid RFB system was used to validate the effectiveness of a protective cell stack and related protection method. The system comprised one multiple-cell U-shape stack, and two 20-gallon electrolyte tanks, each containing about 10 gallons of electrolyte solution. The active area of each cell was about 875 cm². DuPont NAFION 115 membrane and graphite felt electrodes were used in the stack. The electrolyte solutions were prepared electrochemically using a $VOSO_4$ and $VOCl_2$ mixture solution purchased from Bolong New Materials (Dalian, China). The stack performance tests were carried out at about 40° C. The flow rate for both negative and positive electrolyte circulation was fixed at about 10 L/min and controlled by two centrifugal pumps. An Arbin battery tester was used to evaluate the performance of the flow cells and to control the charging and discharging rates of the electrolytes. The cell was charged or discharged at different current densities (80, 120, 140 and 160 mA/cm²) to an end-of-charge voltage of 1.58, 1.60 or 1.62 V, and end of discharge voltage of 0.9 V. The voltage of each cell during charge and discharge was continuously monitored during the tests by the Arbin battery tester.

Figure 3A:
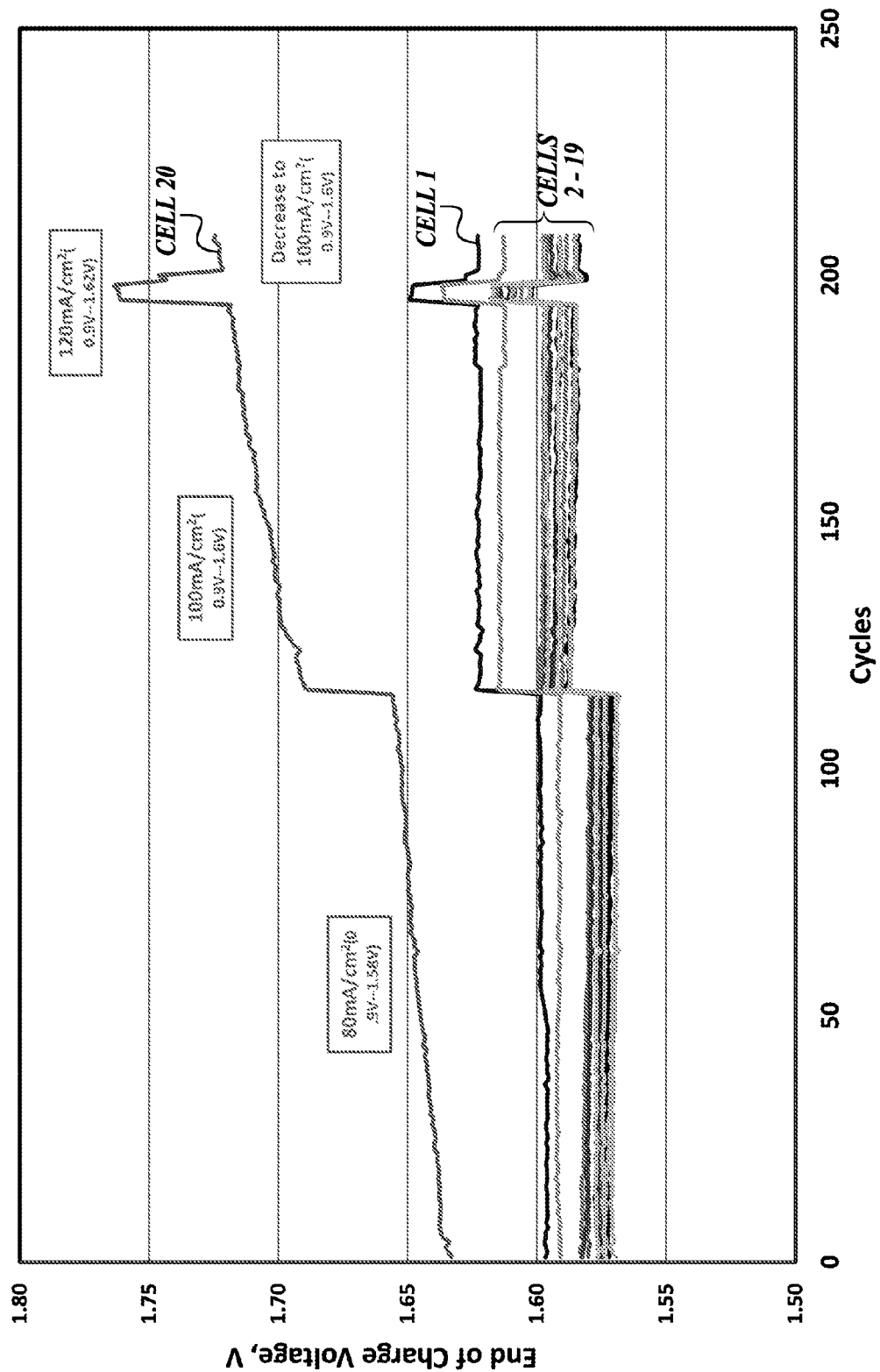
FIG. 3A is a graphical representation showing cell end-of-charge voltage change with cycles for a 20-cell stack of a type previously designed.

FIG. 3A shows the end-of-charge voltage change with charge-discharge cycles of each cell in a 20-cell U-shape stack operating at different current density and cut-off voltage. Cell #1 was the cell closest to the electrolyte inlet and outlet manifold, and Cell #20 was the cell farthest away from the electrolyte inlet and outlet manifold. The end-of-charge voltage of the 20th cell increased dramatically as the cycle number increased. Once the end-of-charge voltage of a single cell reaches more than 1.70 V, the whole stack needs to be taken out of service, and major maintenance is required. At such high end-of-charge voltage, the graphite bipolar plates and the graphite felts deteriorate quickly due to carbon oxidation reactions. The end-of-charge voltage of Cell #1 was also higher than other cells, indicating there was higher work load for this cell as well.

Figure 3B:
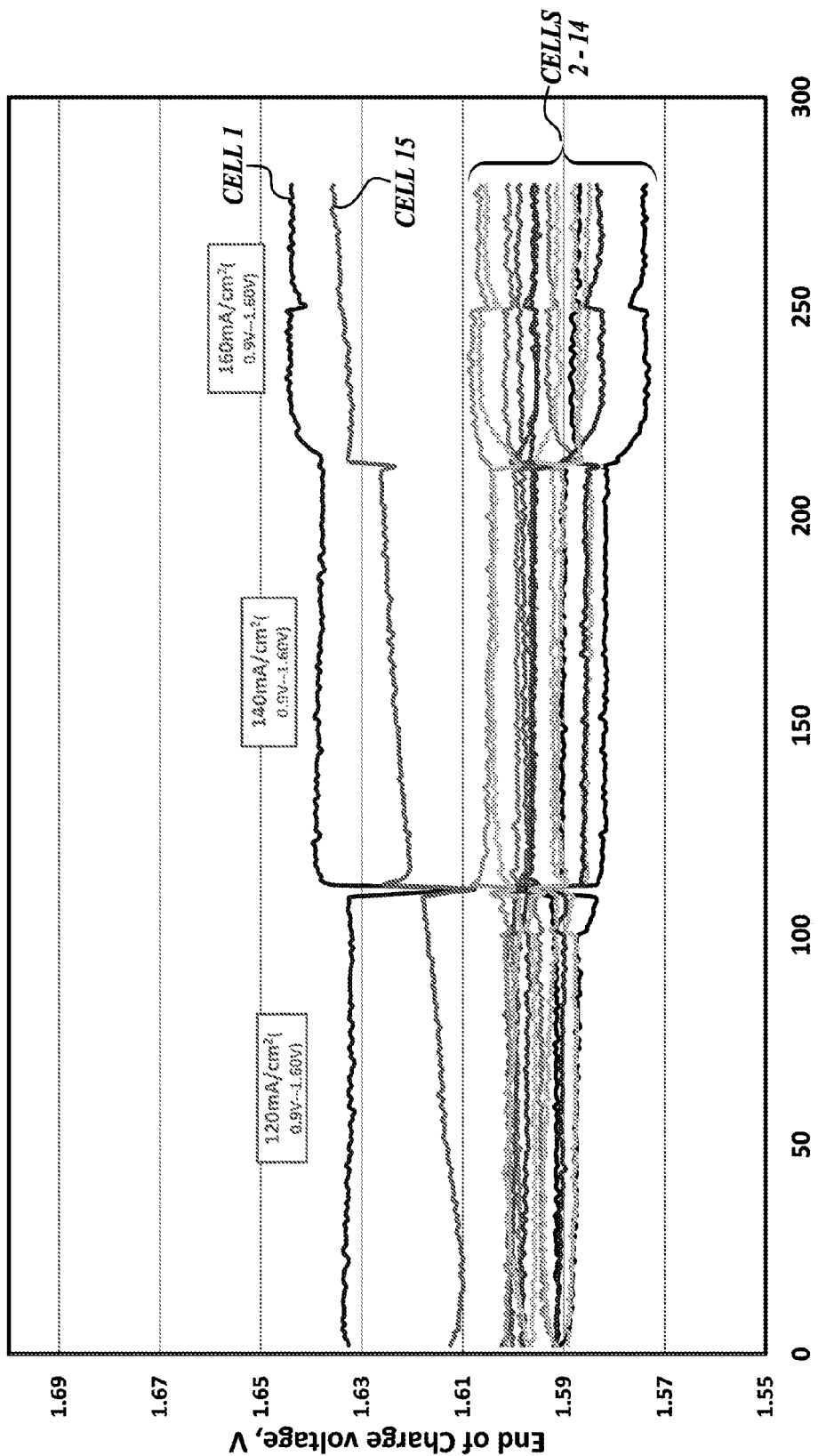
FIG. 3B is a graphical representation showing cell end-of-charge voltage change with cycles for a 15-cell stack of a type known in the prior art.

After about 200 cycles of operation, five cells (Cells 16 to 20) were removed from the stack. The new 15-cell stack was further tested at different current densities and the results are illustrated in FIG. 3B. Although the cell voltage variation range was much narrower than that of the 20-cell stack of FIG. 3A, it can be seen again that the workloads for the two end cells were much higher than those of the other cells. Similar results were also observed with high-power Z-shape stacks. All these results indicate that the workloads for end cells are higher than other cells in the stack, which indicates that eventually the short lifetime of the end cells will determine the lifetime of the entire stack.

Protected Stack

To mitigate the workloads for the end cells and to improve the stack lifetime, two protective cells in accordance with the embodiments of the disclosure were added to the two ends of the stack. FIG. 5A illustrates the structure of the protective cells used (i.e., inner protective cells). The protective cells have a similar structure as that of a regular working electrochemical cell except that the NAFION membrane was replaced by a solid separator, a graphite bipolar plate. The electrolyte solutions can still flow through the protective cells as through regular cells. However, there are no electrochemical reactions in the protective cells during battery operation because the ions cannot transfer through the solid bipolar plate. For some designs (such as inner protective cells), the protective cells need to serve as an electron conductor to keep the entire stack in a closed-circuit loop. Outer protective cells do not need to serve as electron conductors because they are out of the circuit loop. Many materials, such as a piece of plastic cloth or regular ion-selective membrane can be used to separate the two electrolyte solutions.

Figure 6:
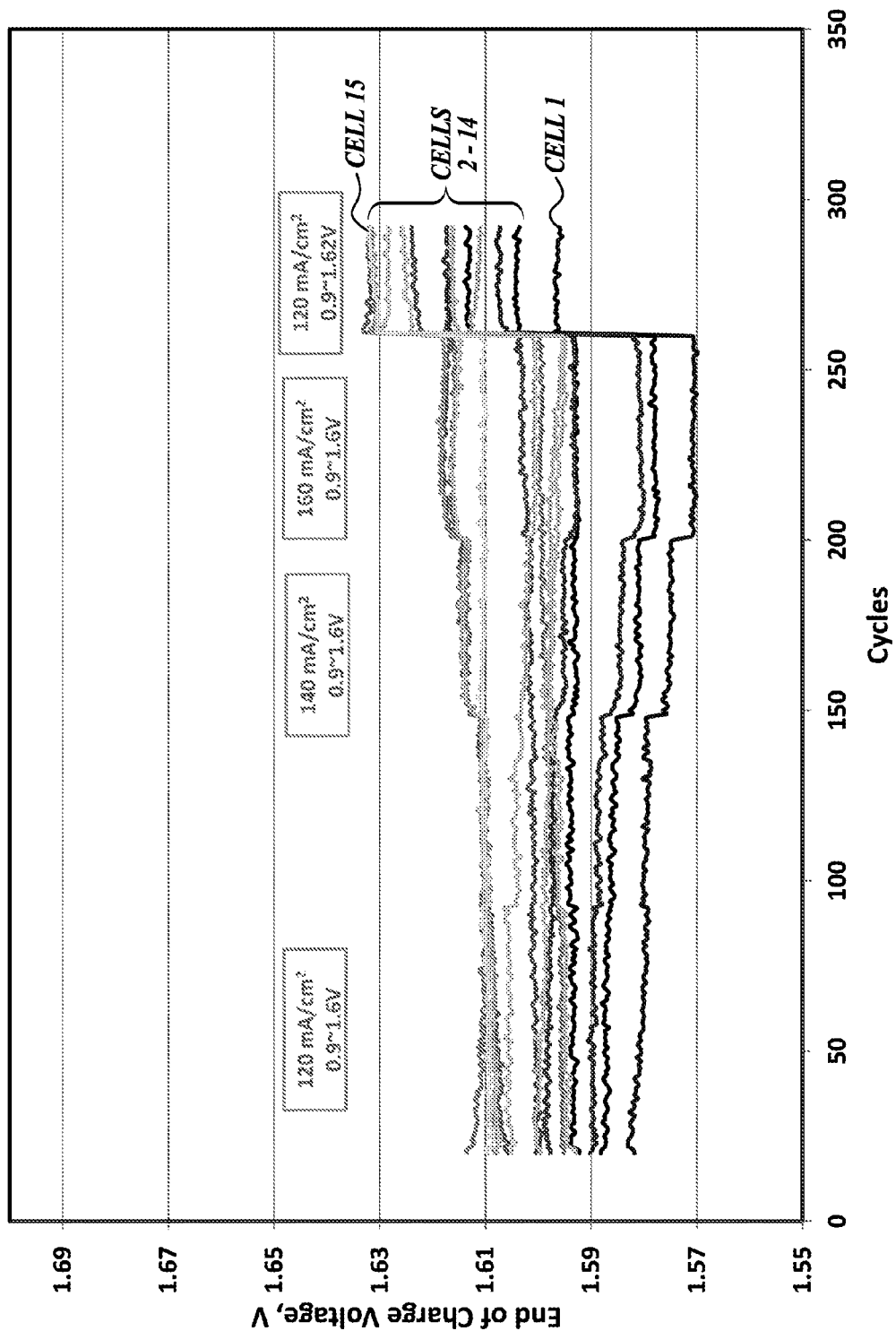
FIG. 6 is a graphical representation showing cell end-of-charge voltage change with cycles for a 15-cell stack with two inner protective cells in accordance with the embodiments of the present disclosure.
Figure 7A:
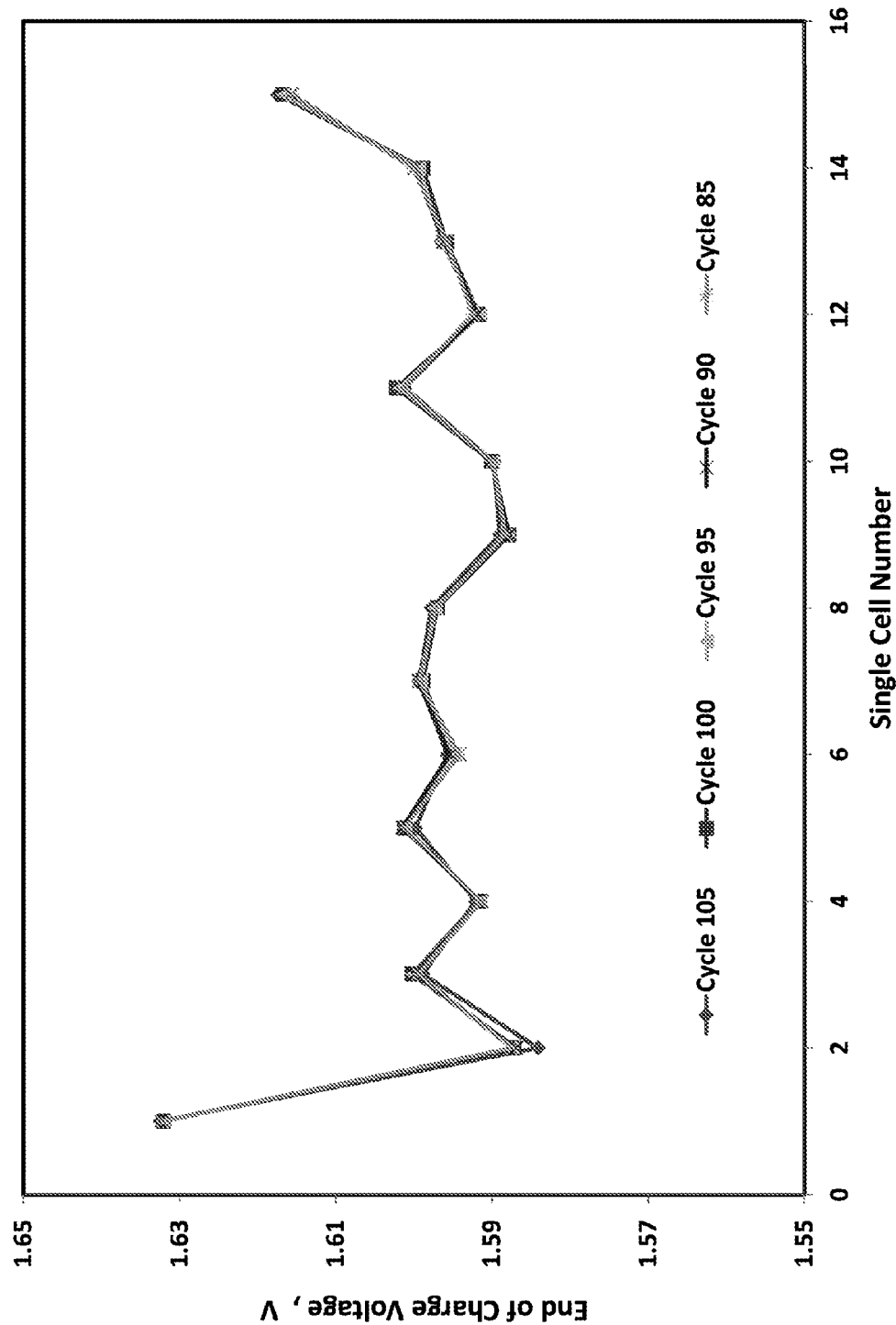
FIGS. 7A and 7B are graphical representations showing cell end-of-charge voltage distribution at 120 mA/cm$^2$ current and 1.60 V cut-off voltage of two 15-cell stacks, wherein FIG. 7A characterizes a 15-cell stack without protective cells and FIG. 7B characterizes a similar 15-cell stack with two inner protective cells in accordance with the embodiments of the present disclosure.
Figure 7B:
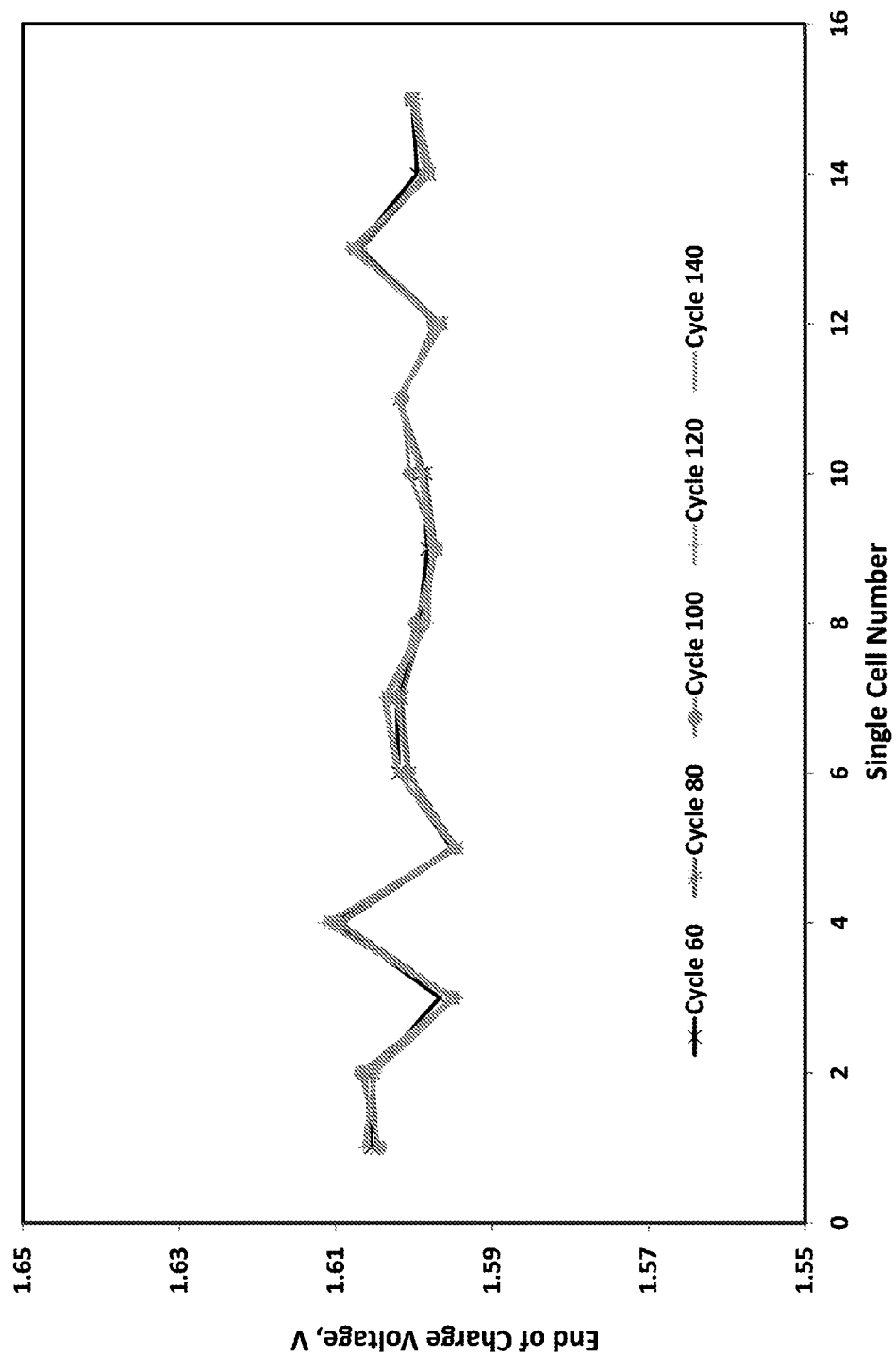

In this example, two inner protective cells were added to a 15-cell stack and FIG. 6 illustrates the cell end-of-charge voltage change with cycles at 120, 140, and 160 mA/cm² current density and 1.60 V cut-off voltage; and at 120 mA/cm² current density and 1.62 V cut-off voltage. With this configuration, the voltage distribution among the cells was largely improved compared to the similar system characterized in FIG. 3B. FIGS. 7A and 7B illustrate the end-of-charge voltage uniformity of each single cell between two 15-cell stacks: FIG. 7A is the traditional stack characterized in FIG. 3B and FIG. 7B characterizes the inner protective cell stack of FIG. 6. These results show that adding protective cells at the end of multi-cell RFB stacks significantly improve the working uniformity of each cell, and therefore the lifetime of the entire stack.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A protected electrochemical cell stack for a redox flow battery, comprising
   (a) a plurality of electrochemical cells configured in a stack, wherein each of the plurality of electrochemical cells comprises a positive portion separated from a negative portion by an ion transfer membrane, wherein the positive portion comprises a cathode separated from the ion transfer membrane by an electrochemical cell catholyte channel, and wherein the negative portion comprises an anode separated from the ion transfer membrane by an electrochemical cell anolyte channel; and
   (b) a first protective cell disposed on a first end of the stack, wherein the first protective cell comprises a first protective cell anolyte channel and a first protective cell catholyte channel, wherein the first protective cell anolyte channel is in liquid communication with at least one electrochemical cell anolyte channel in the plurality of electrochemical cells, wherein the first protective catholyte channel is in liquid communication with at least one electrochemical cell catholyte channel in the plurality of electrochemical cells, and wherein the first protective cell anolyte channel is not in ionic communication with the first protective cell catholyte channel.

2. The protected electrochemical cell stack of claim 1, further comprising an anolyte delivery manifold configured to distribute liquid anolyte to the plurality of electrochemical cells and the first protective cell.

3. The protected electrochemical cell stack of claim 1, further comprising an anolyte return manifold configured to accept liquid anolyte after passing through the plurality of electrochemical cells and the first protective cell.

4. The protected electrochemical cell stack of claim 1, further comprising a catholyte delivery manifold configured to distribute liquid catholyte to the plurality of electrochemical cells and the first protective cell.

5. The protected electrochemical cell stack of claim 1, further comprising a catholyte return manifold configured to accept liquid catholyte after passing through the plurality of electrochemical cells and the first protective cell.

6. The protected electrochemical cell stack of claim 1, further comprising a housing enclosing the first protective cell and the stack.

7. The protected electrochemical cell stack of claim 1, wherein the plurality of electrochemical cells are electrically connected in series.

8. The protected electrochemical cell stack of claim 1, wherein the plurality of electrochemical cells are arranged fluidically in parallel such that the positive portion of one electrochemical cell faces the negative portion of an adjacent electrochemical cell.

9. The protected electrochemical cell stack of claim 1, further comprising a plurality of bipolar plate electrodes, each comprising a positive side and a negative side, wherein the plurality of bipolar plate electrodes are interposed between the plurality of electrochemical cells such that the positive side of one of the bipolar plate electrodes is in electrical communication with the positive portion of one electrochemical cell and the negative side of the bipolar plate electrode is in electrical communication with the negative portion of an adjacent electrochemical cell.

10. The protected electrochemical cell stack of claim 1, further comprising a positive current collector in between a positive end of the stack and the first protective cell.

11. The protected electrochemical cell stack of claim 1, further comprising a negative current collector in between a negative end of the stack and the first protective cell.

12. The protected electrochemical cell stack of claim 1, further comprising a positive current collector disposed adjacent to the first protective cell and distal to the plurality of electrochemical cells.

13. The protected electrochemical cell stack of claim 1, further comprising a negative current collector disposed adjacent to the first protective cell and distal to the plurality of electrochemical cells.

14. The protected electrochemical cell stack of claim 1, further comprising a second protective cell disposed on a second end of the stack, the second protective cell comprising a second protective cell anolyte channel and a second protective cell catholyte channel, wherein the second protective cell anolyte channel is in liquid communication with at least one electrochemical cell anolyte channel in the plurality of electrochemical cells, wherein the second protective catholyte channel is in liquid communication with at least one electrochemical cell catholyte channel in the plurality of electrochemical cells, and wherein the second protective cell anolyte channel is not in ionic communication with the second protective cell catholyte channel.

15. A method of operating a redox flow battery, comprising:
  (a) providing an electrochemical cell stack according to claim 1; and
  (b) flowing anolyte and catholyte through the plurality of electrochemical cells and the first protective cell.

16. A protected electrochemical cell stack for a redox flow battery, comprising
  (a) a plurality of electrochemical cells configured in a stack, wherein each of the plurality of electrochemical cells comprises a positive portion separated from a negative portion by an ion transfer membrane, wherein the positive portion comprises a cathode separated from the ion transfer membrane by an electrochemical cell catholyte channel, and wherein the negative portion comprises an anode separated from the ion transfer membrane by an electrochemical cell anolyte channel; and
  (b) a first protective channel disposed on a first end of the stack, wherein the first protective channel is in liquid communication with either at least one electrochemical cell anolyte channel in the plurality of electrochemical cells or at least one electrochemical cell catholyte channel in the plurality of electrochemical cells, and wherein the first protective channel is configured to allow an electrolyte to pass without undergoing an electrochemical reaction.

17. The protected electrochemical cell stack of claim 16, wherein the first protective channel is configured to receive anolyte and wherein the first protective channel is in liquid communication with at least one electrochemical cell anolyte channel.

18. The protected electrochemical cell stack of claim 16, wherein the first protective channel is configured to receive catholyte and wherein the first protective channel is in liquid communication with at least one electrochemical cell catholyte channel.

19. The protected electrochemical cell stack of claim 16, further comprising a second protective channel adjacent to the first protective channel, wherein the second protective channel is configured to allow an electrolyte to pass without undergoing an electrochemical reaction.

20. The protected electrochemical cell stack of claim 19, wherein there is no ionic communication between the first protective channel and the second protective channel.

21. The protected electrochemical cell stack of claim 19, wherein there is ionic communication between the first protective channel and the second protective channel.

22. The protected electrochemical cell stack of claim 21, wherein there is an ion-transfer membrane between the first protective channel and the second protective channel.

23. The protected electrochemical cell stack of claim 19, wherein the first protective channel and the second protective channel are both configured to receive the same electrolyte.

24. The protected electrochemical cell stack of claim 19, wherein the first protective channel and the second protective channel are configured to receive different electrolytes.

* * * * *